(12) United States Patent
Ellis et al.

(10) Patent No.: US 10,757,254 B1
(45) Date of Patent: Aug. 25, 2020

(54) CALL CENTER INTERFACE

(71) Applicant: Wells Fargo Bank, N.A., San Francisco, CA (US)

(72) Inventors: Stephen M. Ellis, Tahoe City, CA (US); Bipin Sahni, San Francisco, CA (US); David Hatch, Daly City, CA (US); Shahid Razzaq, San Francisco, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

(21) Appl. No.: 16/422,695

(22) Filed: May 24, 2019

Related U.S. Application Data

(63) Continuation of application No. 16/027,995, filed on Jul. 5, 2018, now Pat. No. 10,306,060, which is a continuation of application No. 14/080,382, filed on Nov. 14, 2013, now Pat. No. 10,021,247.

(51) Int. Cl.
*H04M 3/51* (2006.01)
*G06F 3/01* (2006.01)
*H04M 3/523* (2006.01)

(52) U.S. Cl.
CPC .......... *H04M 3/5133* (2013.01); *G06F 3/017* (2013.01); *H04M 3/523* (2013.01); *G06F 3/013* (2013.01); *H04M 2201/38* (2013.01); *H04M 2201/42* (2013.01); *H04M 2203/256* (2013.01); *H04M 2203/258* (2013.01); *H04M 2203/551* (2013.01)

(58) Field of Classification Search
CPC .. H04M 2201/38; H04M 3/5133; G06F 3/017
USPC ...................................................... 379/265.11
See application file for complete search history.

(56) References Cited

U.S. PATENT DOCUMENTS

| | | | |
|---|---|---|---|
| 2009/0281967 A1* | 11/2009 | Jaffer ................. | H04M 3/5191 706/11 |
| 2013/0216038 A1* | 8/2013 | Fagundes ............ | H04M 3/5133 379/265.13 |
| 2014/0351268 A1* | 11/2014 | Weskamp ............. | G06F 3/0488 707/748 |

* cited by examiner

*Primary Examiner* — Ahmad F. Matar
*Assistant Examiner* — Jirapon Intavong
(74) *Attorney, Agent, or Firm* — Walter Haverfield LLP; James J. Pingor

(57) ABSTRACT

One or more embodiments of techniques or systems for intelligent data presentation are provided herein. Data can be presented on similar devices having different characteristics in different manners. For example, data may be rendered in a first manner on a first device having one monitor, the same data may be rendered in a second manner on a second device having two displays or a different display size. Financial information, sales data, banking information, etc. may be presented in a variety of ways based on capabilities or properties of a device accessing the information or data. Similarly, renderings may be selected based on interaction capabilities or interaction options a user may have with different renderings or presentations. In other embodiments, user interaction with an automated teller machine (ATM), call center, vehicle, or other interface can be based on device properties or device capabilities.

4 Claims, 13 Drawing Sheets

CALL CENTER INTERFACE

CROSS-REFERENCE TO RELATED APPLICATIONS

This application is a continuation of pending U.S. patent application Ser. No. 16/027,995 entitled "CALL CENTER INTERFACE" and filed Jul. 5, 2018, which was a continuation of then U.S. patent application Ser. No. 14/080,382 entitled "CALL CENTER INTERFACE" and filed Nov. 14, 2013 (issued Jul. 10, 2018 as U.S. Pat. No. 10,021,247). The entireties of the above-noted applications are incorporated by reference herein.

BACKGROUND

Generally, a visualization is a way or a type of rendering to present data to a user. For example, a visualization may be a bar graph, a chart, a scatter plot, etc. When data from a data set is visualized or presented, such as by a visualization system, visualizations are often tightly coupled with the data set that is being presented. This means that a data set may be presented using merely one type of visualization. For example, when a data set is two-dimensional or 2-D, the data set may include one or more columns of data entries and one or more rows of data entries. The columns of the data set may represent features or fields, while the rows of the data set may correspond to records of those features or fields. However, as a data set is updated, such as when the number of rows or the number of columns changes, the generated visualization may no longer remain effective. That is, program code or source code for generating a visualization may follow assumptions related to a structure of the data set or a format of the data set. As a result, a visualization generated from this source code may be tightly coupled with the data set. In this way, data sets are often presented in a limited manner, such as by making certain assumptions about the structure of data, for example.

Data sets tend to be dynamic by nature because an incoming data set or a received data set can take many forms. As an example, a scatter plot is a type of visualization which can be used to represent data from a data set as one or more points in two-dimensional (2-D) space or three-dimensional (3-D) space. Scatter plot visualizations are capable of handling multi-dimensional data, but rely on data sets to be hierarchically arranged or hierarchically compared (e.g. one number being smaller than, equal to, or greater than another number). When a field of a data set is not hierarchically arrange-able or hierarchically comparable, scatter plot visualizations may not be as useful. In other words, if a new field (which is not hierarchically comparable) is added to a data set, the new field may 'break' an associated visualization. In other scenarios, the added field may be omitted or ignored by the visualization, thereby adding little or no value to the visualization. Similarly, if a previously available field is no longer available, the existing visualization may not function properly.

In some scenarios, a basic property of a field of a data set may change when new information or data is received, thereby changing properties of a data set. For example, data of a data set related to a graph of a social network (e.g., where the nodes of the graph represent entities or individuals and the edges of the graph represent connections or relationships between entities) may often change on the fly or on an ongoing basis. That is, new information about existing connection can become available, like someone owing money to another connected person, or one person being a mentor of another person, for example. In other scenarios, it may not be known what type of data will be received, such as a number of columns or fields, a number of rows or records, properties of the data set, etc.

The dynamic nature of data sets can be addressed by implementing a search. For example, if a visualization requires a field or field type, corresponding fields may be searched within the data set. This means that the visualization can be agnostic of the location of that particular field within the data set. In other words, the visualization can be independent of the location of a field in the data set. Additionally, a format of a data set may be changed (e.g., such as from an integer data type to a decimal data type) without necessarily compromising the meaning of the data set. Although some degree of flexibility can be achieved, these attempts merely adjust data sets to conform to requirements which are hard coded into the source code for generating visualizations.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

One or more embodiments of intelligent data management are provided herein. A presentation can be realized based on properties of a data set (e.g., the number and type of fields or columns in the data set). A system for data presentation, data presentation system, or an intelligent data presentation system can visualize, render, or present data of a data set using a variety of schemes, formats, visualizations, or presentations based on one or more data set properties. Additionally, the data presentation system can detect one or more capabilities of a device (e.g., device capabilities) or one or more properties of a device (e.g., device properties) and render or select an appropriate presentation or visualization based on these capabilities or properties. Because the capabilities or properties of a device can be taken into account when selecting a presentation or visualization, presentations, renderings, or interfaces can be generated, selected, or presented in a more effective manner.

As an example, a pool of one or more presentations may be rendered or generated for a data set and a presentation may be selected or matched from the pool of presentations as a best fit for a device based on one or more device properties or one or more device capabilities. According to other aspects, a single presentation may be selected as a best fit for a device and be rendered or presented by the device. Here, the selection of the presentation can be based on one or more of the device properties, device capabilities, or data set properties. That is, in some scenarios, multiple presentations or a pool of presentations may be generated or selected, while one presentation may be generated (e.g., from a pool of available or possible presentations) in other scenarios.

As a result, presentations, interfaces, or renderings can be rendered or presented in a dynamic manner when a new type of data set or a new field of a data set is encountered or consumed. This means that different presentations can be presented in different scenarios, such as after a data set is changed or updated, or when a data set is accessed from different devices having different properties or capabilities. For example, when a user accesses his or her banking data on a first mobile device (e.g., mobile phone or smartphone), a first presentation may be presented, while a second presentation (e.g., different than the first presentation) may be presented when the user accesses the banking data on second mobile device (e.g., different than the first mobile device, such as having a different screen size, etc.). As another example, if a mobile device is associated with a data plan or has limited data usage or a slower network speed than another device, a first presentation presented on a mobile device may include high level information or be in text format, while a second presentation presented on a desktop computer may include more detailed information or have more graphical content or higher resolution content. In yet another example, a first presentation may be presented while a device is in a first mode (e.g., a vehicle in drive) and a second presentation may be presented while a device is in a second mode (e.g., a vehicle in park).

Further, a presentation may be selected based on potential interactions a user may have with the presentation. Similarly, potential interactions may be determined based on device capabilities, which may include capabilities enabled via peripherals attached to the device (e.g., a mouse, a motion sensor, an image capture device, etc.), and the like. In this way, data sets can be loosely coupled with presentations or visualizations. Data sets may be decoupled such that a data presentation system can dynamically select a proper, matching, or best fit presentation from a pool of presentations for a corresponding data set or a newly encountered data set having a new data set type according to one or more device properties.

The following description and annexed drawings set forth certain illustrative aspects and implementations. These are indicative of but a few of the various ways in which one or more aspects are employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

DETAILED DESCRIPTION

Figure 1:
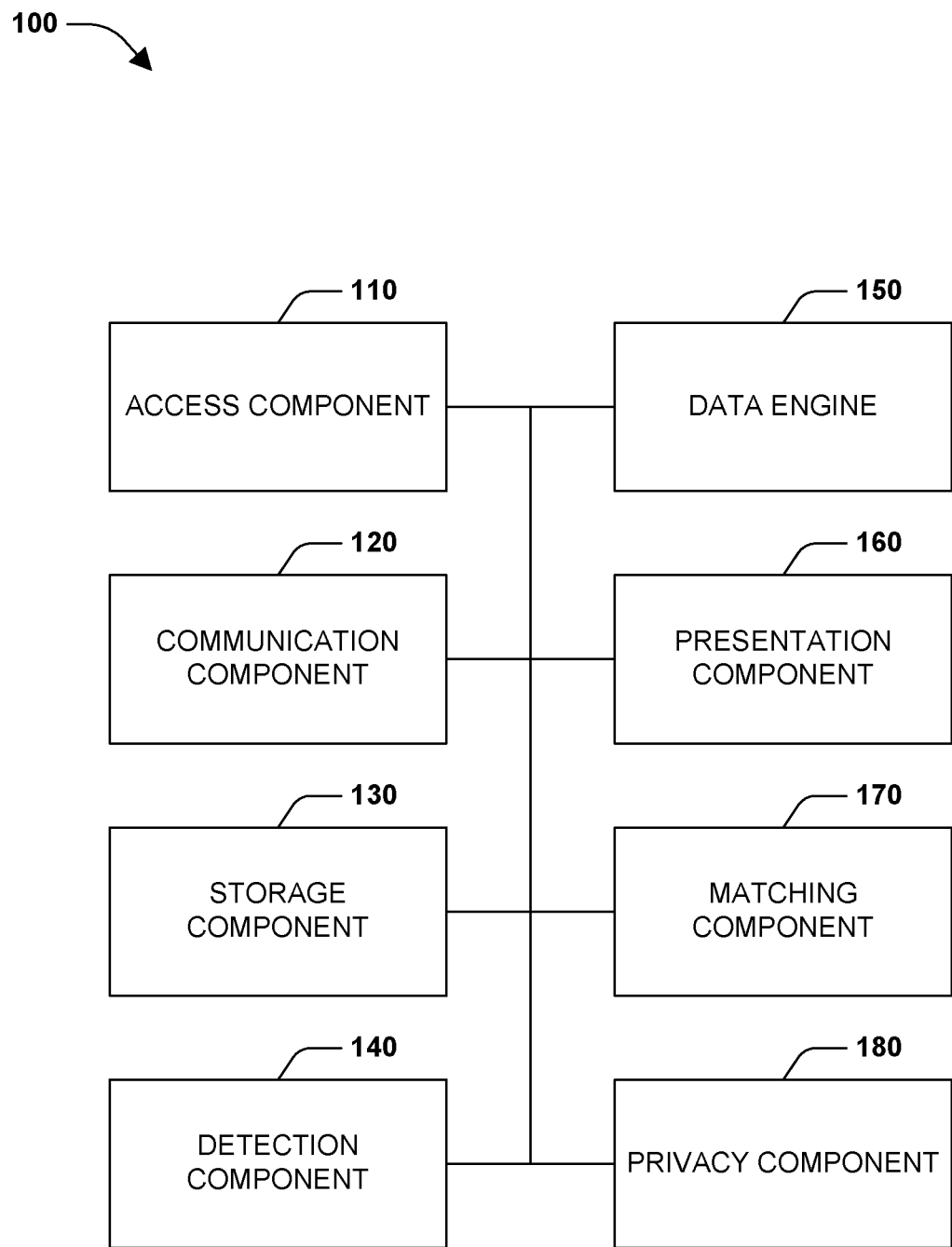
FIG. 1 is an illustration of an example system for intelligent data presentation, according to one or more embodiments.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art. Although features may be described with reference to one embodiment, for example, it will be appreciated that these features may be implemented in other embodiments.

Figure 13:
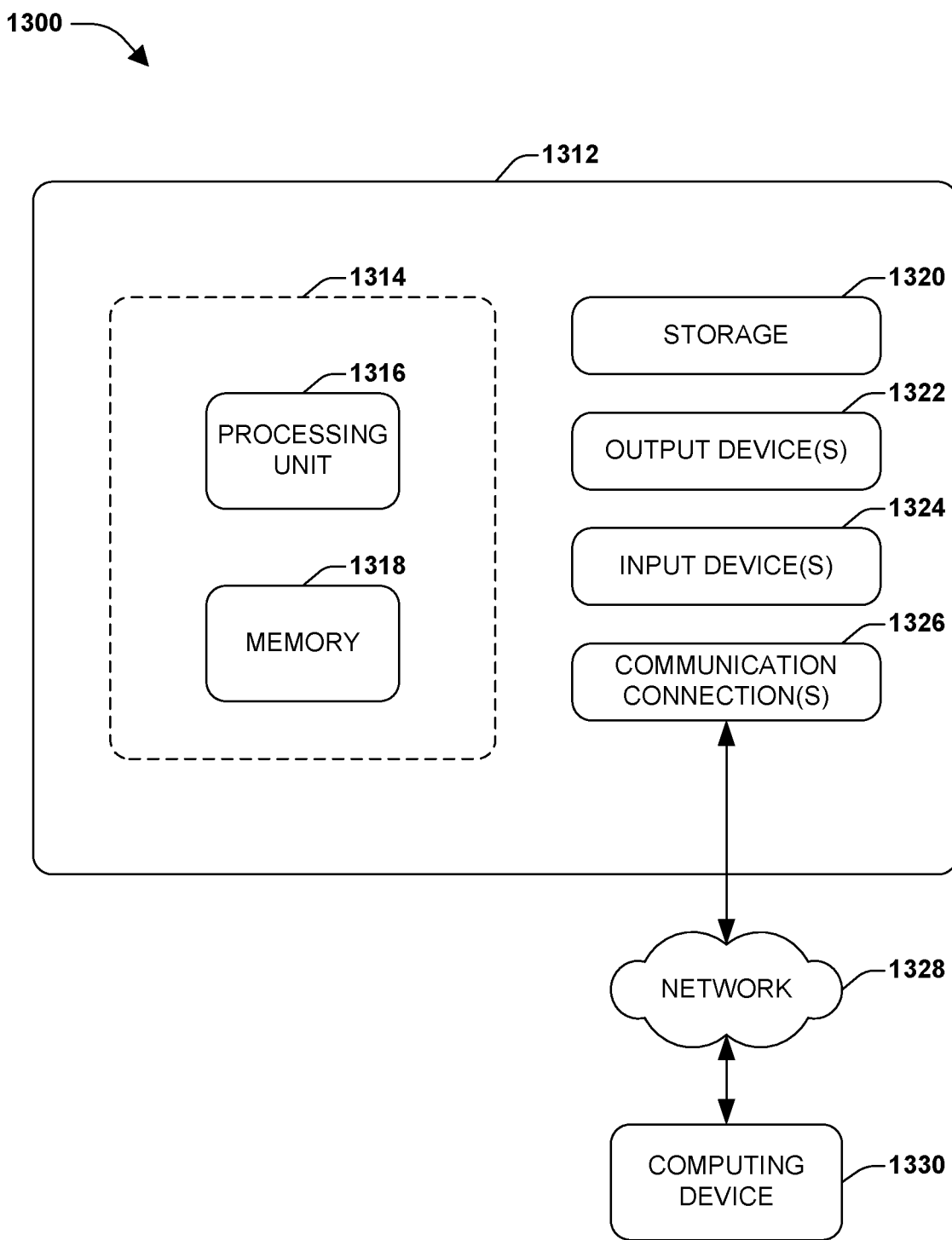
FIG. 13 is an illustration of an example computing environment where one or more of the provisions set forth herein are implemented, according to one or more embodiments.

For one or more of the figures herein, one or more boundaries, such as boundary 1314 of FIG. 13, for example, may be drawn with different heights, widths, perimeters, aspect ratios, shapes, etc. relative to one another merely for illustrative purposes, and are not necessarily drawn to scale. For example, because dashed or dotted lines may be used to represent different boundaries, if the dashed and dotted lines were drawn on top of one another they would not be distinguishable in the figures, and thus may be drawn with different dimensions or slightly apart from one another, in one or more of the figures, so that they are distinguishable from one another. As another example, where a boundary is associated with an irregular shape, the boundary, such as a box drawn with a dashed line, dotted lined, etc., does not necessarily encompass an entire component in one or more instances. Conversely, a drawn box does not necessarily encompass merely an associated component, in one or more instances, but can encompass a portion of one or more other components as well.

As used herein, a rendering, a visualization, a presentation, an interface, etc. can refer to or include audio and/or video. In other words, renderings, visualizations, presentations, or interfaces are not limited to a visual presentation, such as a graph or a chart, for example. Additionally, rendering, visualization, presentation, or interface may be used interchangeably herein. Similarly, presenting, generating, rendering, and the like may be used interchangeably as well. However, it will be appreciated that in one or more embodiments, an interface may include one or more visualizations or one or more presentations. Similarly, a rendering may include one or more visualizations or one or more presentations. Rendering can include transmitting, outputting, displaying, presenting, executing, etc.

Generally, data sets, such as banking data is accessible from a wide variety of devices. For example, a banking portal or website can be accessed from a desktop computer, a laptop, a tablet, a mobile device (e.g., smartphone), etc. Typically, data from a data set is rendered or visualized in the form of a visualization. In one or more embodiments, a data presentation system can optimize renderings or visualizations based on properties of a device (e.g., device hardware, device software, peripherals, device usage context, device context, device location, etc.) which is being used to access the data set. It will be appreciated that different devices may have different device properties, such as two devices having the same device type. For example, a first smartphone may have a larger display than a second smartphone. As another example, a first computer may have a faster central processing unit (CPU) than a second computer. As a result, renderings, presentations, interfaces, or visualizations may be customized or rendered differently based on device properties.

FIG. 1 is an illustration of an example system 100 for intelligent data presentation, according to one or more embodiments. The system 100 of FIG. 1 can include an access component 110, a communication component 120, a storage component 130, a detection component 140, a data engine 150, a presentation component 160, a matching component 170, or a privacy component 180. In one or more embodiments, the system 100 may include additional or alternate components, such as one or more databases, an image capture component, a motion detection component, one or more sensor components, a learning component, and the like.

The access component 110 can enable, grant, deny, or disable access to a data set, such as account information. For example, the access component 110 may validate an identity of a user by matching a username with a password. That is, a user logging into a banking portal may be required to enter his or her login and corresponding password to gain access to account information linked to his or her account. In one or more embodiments, the access component 110 may utilize security questions or the like to control access to a data set or account information.

In one or more embodiments, the communication component 120 can establish a connection with a server or third party server to receive data or a data set. In other embodiments, the data or the data set may be downloaded, stored on, or internal to the system 100. For example, the storage component 130 can store or house data for one or more data sets. To this end, a data set is generally one of the inputs for a data presentation system or the system 100 of FIG. 1. However, it will be appreciated that the communication component 120 may not be required in other embodiments, such as when the system 100 is a standalone system.

It will be appreciated that there are a variety of ways in which incoming data can be summarized or characterized. For example, a 2-D data set may be viewed as two sets or subsets of sub-properties (e.g., a first set or subset associated with the columns of the data set and a second set or subset associated with the rows or records of the data set). Columns or fields of the 2-D data set can include a field identifier (ID) or field ID for identifying a field, a field type which indicated how data in the field is represented (e.g., as text, numeral, date, coordinates, etc.), a field priority indicative of a relative priority for displaying a corresponding field (e.g., if a presentation is not capable of displaying all fields, then the field priority can be used to select a subset of fields to be visualized), a field orientation which may be used to determine whether a field should be anchored to a display axis for visualization (e.g., the field orientation may have a primary axis, a secondary axis, a tertiary axis, etc., thereby enabling field to be bound or anchored to such axes for various visualizations), a field visibility which can be used to determine the extent to which a field is visible (e.g., visible, invisible, balloon tip visible, etc.), or a field group which is indicative of a number of unique values or groups in a data set for a column.

Similarly, rows or records of the 2-D data set can include a record count indicative of a number of records in the data set or a record interlink indicative of how different records or rows may be associated or interlinked with one another. As new rows or records are received, such as at runtime, metadata associated with the data set or the data set may be updated.

Regardless, data or data sets may be accessible, stored on, or received from the communication component 120 or the storage component 130. In one or more embodiments, the communication component 120 may receive a data set via a telematics channel, a wireless connection, a wired connection, Bluetooth, near-field communication (NFC), a wireless channel, Wi-Fi Direct, etc. Additionally, the storage component 130 can receive one or more properties associated with a data set (e.g., data set properties), such as from the data engine 150. The storage component 130 may pass these data set properties along to one or more other components of the system 100 of FIG. 1, such as the presentation component 160 or the matching component 170, for example. Data set properties can include field IDs, field types, field priorities, number of rows, number of columns, data types, field orientations, field visibility, etc. In one or more embodiments, one or more of the data set properties may be used to determine how data from a data set is presented or visualized and will be discussed in greater detail herein.

Generally, a user can access a data set from a variety of devices or types of devices, such as a desktop computer, a laptop computer, a mobile device, a tablet device, a gaming console, a portable device, a handheld device, a headless device, a set top unit or set top box, a smart television, a vehicle, an automated teller machine (ATM), an appliance, a brain computer, a brain machine, a smart watch, a digital whiteboard, a touch computer, a projection screen, a wearable computer, etc. Display components for such devices can include a screen, a retinal scan display (RSD), a retinal projector, etc. Because these devices can have a variety of characteristics or properties, presentations, visualizations, interfaces, or renderings of a data set can be carried out, presented, or implemented differently on different devices. Further, similar devices may have different peripherals attached, creating additional possibilities. As used herein, a device may be a target device, which can be a device which is intended to be the recipient of a data set.

The detection component 140 can receive, detect, or transmit one or more properties of a device (e.g., device properties) which is being utilized (e.g. by a user) to access a data set. In other words, the detection component 140 can determine what capabilities a device has, and utilize those capabilities or properties to display, present, or visualize a data set for a user according to one or more of those capabilities or properties. The detection component 140 can pass these device properties along to one or more other components of the system 100 of FIG. 1. This means that once the device properties are detected, determined, transmitted, or received, one or more of the device properties can be utilized to determine a visualization, interface, rendering, or presentation for a data set.

Device properties can include capabilities of a device in view of one or more attached peripherals or currently attached peripherals. In one or more embodiments, device properties can include potential capabilities associated with attachable peripherals which may not be attached at the moment. Because one or more device properties can be detected and considered, presentations or renderings generated by the presentation component 160 can be loosely coupled with a corresponding data set. In other words, a presentation or rendering may be selected as appropriate (e.g., based on device properties, among other things), rather than merely generating or rendering a single presentation or rendering for a data set (e.g., which is presented as a default regardless of device characteristics or device properties).

For example, if a device has a motion sensor peripheral connected, attached, or coupled thereto, the detection component 140 may determine that the device has motion sensing capabilities based on the attached motion sensor peripheral. In this way, the detection component 140 can detect or determine one or more device properties for a device and most any peripheral attached to or connected to the device. It will be appreciated that in some scenarios, a device may include one or more attached peripherals, systems, components, subsystems, etc., while a device may not include attached peripherals, etc. in other scenarios. Additionally, the detection component 140 may be implemented on a device being utilized to access a data set or on a server. Regardless, the detection component 140 can detect, receive, or transmit one or more device properties for a device.

As another example, a desktop computer may have a mouse and a keyboard attached as peripherals. Other devices, such as a tablet, for example, may have alternative components or interfaces for capturing gestures, user inputs, or user interactions. The detection component 140 can determine one or more device properties (e.g., and attached peripherals) and pass these properties, capabilities, attributes, characteristics, etc. on to the presentation component 160, the matching component 170, a data engine 150 or a logic engine, etc. Here, a first rendering may be generated for the desktop computer, while a second rendering may be generated for the tablet based on the differing characteristics between the two devices.

In one or more embodiments, the detection component 140 can infer or determine potential peripherals that may be attached. For example, if a device previously had a web camera attached via universal serial bus (USB), the detection component 140 may note the previously attached web camera in a peripheral history or driver log of the device. To this end, the detection component 140 may suggest that the user connect or attach the web camera to enhance the user's data presentation experience. In other words, the detection component 140 may suggest connecting one or more potential peripherals to a user. These suggestions may be based on peripheral drivers installed on the device, a peripheral history log, etc.

The detection component 140 may utilize a script or application program interface (API) to determine one or more of the device properties. That is, a shadow channel may be utilized to determine or define capabilities of the hardware of a device. To this end, the rendering and/or selection of an interface, visualization, presentation, etc. may be based on device properties accordingly.

As used herein, device properties can include device capabilities, device functionality, presentation capabilities, visualization capabilities, etc. In other words, device properties can include attributes, characteristics, or capabilities available on a device available due to the hardware of the device, software installed on the device, peripherals attached to the device, a context of the device, network characteristics associated with the device, a location of the device, etc.

Hardware of a device or device hardware can be analyzed to determine suitable renderings, presentations, or visualizations. For example, device properties associated with hardware of the device may include a display size, a display resolution, a pixel density of a display, a battery size, remaining battery or power level, a display type, number of displays, a number of available display colors, a processor speed, a memory size, available memory, available storage, graphical processing unit (GPU), etc. For example, mobile devices, such as mobile phones or smartphones may come with a variety of display sizes. An older phone may have a smaller display size than a newer phone. To this end, a user of the newer phone may be provided with a different rendering of the same data set being accessed by a user of the older phone based on the discrepancy in display size (e.g., as detected by the detection component 140).

Similarly, software on a device may be analyzed to determine one or more of the device properties. Device properties associated with software may include applications installed on the device, plugins installed on the device, assistive interfaces, accessibility options, available fonts, etc. For example, if a standard software platform (e.g., Java) is detected by the detection component 140, a rendering with animations may be selected over renderings without animations. As another example, if an accessibility option to display larger fonts is enabled, renderings may be generated or selected accordingly. In this way, the detection component 140 can detect, retrieve, or transmit one or more device properties associated with software installed on the device or software options selected, for example.

As mentioned, device properties can include properties associated with peripherals attached to device, detected peripherals, peripheral device logs, history, drivers installed, inputs, outputs, output capabilities, device interface capabilities, interface types, user-interaction capabilities, human-interface capabilities, human-computer interface capabilities, etc. Examples of peripherals or device capabilities may include a mouse, a keyboard, speakers, a microphone, a headset, a web camera, a motion sensor, an image capture component, gaze detection, gesture detection, voice recognition, etc.

Additionally, device properties may include a context of a device. In other words, a device property may include how a device is being used. For example, a vehicle in drive or in gear is being utilized differently than a vehicle in park or off. When the vehicle is in drive, the vehicle may be associated with a device property of being in operating mode. Conversely, when the vehicle is in park, a device property of the vehicle may be a stationary mode. As another example, a device accessing a data set in a public setting may render a data set with a different rendering than the same device accessing the same data set in a private setting. The setting may be determined by the privacy component 180 and may be based on a global positioning system (GPS) location, a number of people detected, an ambient noise level, etc. To this end, this privacy setting can be passed to the detection component 140 and utilized as a device property. In other words, a device property can include a mode of a device, a state of a device, usage of a device or attached peripherals, etc.

Further, device properties can include network characteristics associated with device. For example, the detection component 140 can determine a network speed (e.g., 3G, 4G, mbps, upload speed, or download speed). The detection component 140 can determine whether a data set is being accessed on a secure, non-secure, or encrypted network (e.g., public setting or private setting). In one or more embodiments, the detection component 140 may determine one or more device properties based on data characteristics, such as a data plan associated with the device, bandwidth, available data, whether data is being or will be throttled, etc. In other embodiments, device properties may include a location of a device or a time zone associated with the device.

In one or more embodiments, the detection component 140 may analyze one or more of the device properties and use these device properties to make an inference. For example, if the detection component 140 detects that a device, such as a personal computer, is setup with assistive technology, such as a microphone, a read text aloud tool, and other ease of access or accessibility tools, the detection component 140 may make a determination or an inference that the user of the personal computer is blind. To this end, presentations, renderings, or visualizations may be selected accordingly, such as by placing an emphasis on audio renderings.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In one or embodiments, a data engine 150 can analyze data from a data set. This means that the data engine 150 can determine or infer a use for the data set or the meaning of the data within the data set. That is, the data engine 150 can determine a context in which the data is being stored or a use for the data. For example, the data engine 150 may determine that a set of data including departure locations, arrival locations, departure times, and arrival times is a data set for a flight map. In other embodiments, the data engine 150 can determine the context, the meaning of the data set, or the meaning of fields within the data set. As another example, the data engine 150 may recognize that data from a data set is 2-dimensional or that the data set has two columns of data. In one or more embodiments, the data engine 150 can receive a current scenario or a hypothetical scenario and analyze the scenario to provide a result oriented suggestion, an estimate, or projection.

Additionally, the data engine 150 can analyze a data set to determine one or more data set properties. The data engine 150 may transmit or pass one or more of these data set properties to one or more other components or a server. In one or more embodiments, the data engine 150 can determine or select one or more renderings or one or more presentations for a data set based on properties of the data set or one or more of the data set properties. This means that the data engine 150 can determine a rendering based on characteristics of the data, in addition to one or more of the device properties. For example, if the data engine 150 determines that data from the data set is 2-dimensional, the data engine 150 may select a scatter plot as an option for rendering or as a possible visualization.

In one or more embodiments, the data engine 150 can detect, receive, or generate a data set summary indicative of one or more properties of the data set or one or more data set properties. A data set summary can be utilized by the presentation component 160 to quickly determine which visualizations, renderings, or presentations are best for presenting data associated with a corresponding data set. This means that the data engine 150 can determine attributes associated with the data set. Regardless, the data set properties or the data set summary can be consumed by a data presentation system, such as the system 100 of FIG. 1. In other words, these data set properties can serve as an input to a system for data presentation. As a result, one or more presentations or visualizations may be generated and a presentation or visualization can be selected based on one or more of the data set properties or attributes of the data set (or the data set summary).

The data engine 150 can determine one or more fields of interest within a data set. This means that the data engine 150 can highlight important data. In one or more embodiments, the data engine 150 can make a portion of the data set or one or more fields invisible, such as when those fields are not relevant to the user or not desired, for example. In other words, the data engine 150 can select which fields of a data set will be primary fields, and which fields will be secondary, tertiary, invisible, etc. Additionally, the data engine 150 can generate a property summary, a visualization property summary, or presentation property summary from one or more presentation properties for a visualization or a presentation. These summaries may be indicative of which fields of a data set are of interest.

For example, a visualization or rendering may be associated with properties that indicate which data or fields of a data set should be displayed on which axes (e.g., primary, secondary, tertiary, etc.). In other words, a visualization property summary can be indicative of ways in which an associated visualization may be utilized in the most effective manner, such as by matching properties of presentations against properties of data sets. In one or more embodiments, when a data set is received, a user can specify or identify one or more fields of interest. These fields of interest can be viewed as metadata of the data set. This metadata can be matched against visualization or presentation properties of a visualization or presentation, and scored, thereby providing a way to rank various visualizations or presentations. Further, if one or more fields of the data set changes on the fly, or properties of the data set change on the fly (e.g., such as the data type), the data engine 150 can re-score or re-select a visualization or presentation from a pool of presentations. In this way, visualizations or presentations can be loosely coupled with a data set.

In one or more embodiments, the data engine 150 can retrieve a data set, such as account information associated with a user. The data engine 150 can retrieve a data set from a remote source, such as a server, or from a local source, such as the storage component 130. Additionally, the data engine 150 may retrieve one or more of the data sets based on a user inquiry and/or an identity of the user, as will be described in greater detail herein.

The presentation component 160 can generate or render a pool of one or more presentations, renderings, interfaces, or visualizations for a data set from one or more available presentations, renderings, interfaces, or visualizations. In one or more embodiments, the presentation component 160 may generate multiple renderings or presentations and the matching component 170 may score or select a rendering or presentation from the pool of renderings or presentations. In other embodiments, the matching component 170 selects a presentation to be rendered and the presentation component 160 renders or generates that presentation or rendering. In other words, a pool of presentations or renderings may be generated upfront in some scenarios and generated on a requested basis in other scenarios.

As used herein, a rendering, a visualization, a presentation, an interface, etc. can refer to or include audio and/or video. In other words, renderings, visualizations, presentations, or interfaces are not limited to a visual presentation, such as a graph or a chart, for example. Additionally, rendering, visualization, presentation, or interface may be used interchangeably herein. However, it will be appreciated that in one or more embodiments, an interface may include one or more visualizations or one or more presentations. Similarly, a rendering may include one or more visualizations or one or more presentations.

A visualization, rendering, chart, graph, presentation, etc. may utilize one or more visual axes or axes. For example, a visualization in the Cartesian coordinate system may utilize an x-axis and a y-axis, while other visualizations, such as 3-D visualizations, may utilize the x-axis, the y-axis, and the z-axis. In one or more embodiments, a presentation, rendering, or visualization generated by the presentation component 160 can be supplemented with additional or higher dimensions of data. This means that the presentation component 160 may supplement, modify, add, aggregate, collect, filter, or tag a data set with additional information, such as color or size, for example. That is, a data set may include two columns and a plurality of rows or records. In one or more embodiments, a visualization of a scatter plot may be created for the data set by the presentation component 160, where the scatter plot may represent a collection of points for the data set. Here, the presentation component 160 may, as an example, highlight points of the data set which fall within a standard deviation or a range. As another possibility, the presentation component 160 may present these points by rendering them with a larger size or a different color, thereby facilitating a higher likelihood that a user will pay more attention to the larger size data points, for example.

Further, the presentation component 160 can designate one or more axes with a field orientation or priority. In other words, the presentation component 160 can label or identify an axis as primary, secondary, tertiary, preferred, etc. Stated yet another way, the presentation component 160 can render or generate axes of a presentation or a visualization based on a likelihood of capturing attention of a user. Examples of visualizations, renderings, or presentations may include scatter plots, 2-dimensional graphs, 2-dimensional charts, 3-dimensional graphs, 3-dimensional charts, bar graphs, pie charts, graphs, charts, maps, graphs which include nodes and edges (e.g., representing a social network, a flight map, streets and intersections, etc.), maps marked with locations, heat maps, histograms, tag clouds, etc.

The presentation component 160 can generate one or more presentation capabilities or one or more presentation properties for one or more of the renderings, presentations, or visualizations. For example, presentations, renderings, or visualizations can have their own set of presentation capabilities or properties. These presentation properties can be indicative of how effective a presentation may be in visualizing one or more types of data or data sets. In other words, presentation properties may be a measure of how well a presentation or visualization fits a particular data set or device. The presentation properties can be associated with a field type of a data set.

Further, the presentation component 160 can be configured to generate a presentation capability summary or a presentation property summary for one or more of the presentations. These presentation property summaries can represent or be indicative of one or more scenarios or one or more conditions where the associated presentation may be effective or desired and utilized by the matching component 170 to determine one or more matching presentations, visualizations, or renderings. For example, a scatter plot may be useful for presenting or visualizing 2-dimensional data sets. However, some 2-dimensional data, such as, a change in an account balance over time may not be as useful when rendered using a scatter plot. For example, the change may be better rendered or visualized as a line graph or line chart. A presentation property summary associated with a scatter plot may thus indicate that the scatter plot is useful for rendering such data (e.g., 2-dimensional data or not for the purpose of viewing a change over time). In this way, the presentation component 160 can generate one or more presentation property summaries for one or more available presentations or presentation types.

In one or more embodiments, the presentation component 160 can render or generate one or more renderings, visualizations, or presentations based on one or more of the presentation property summaries. This means that certain visualizations or renderings may be weighted, favored, or scored higher than others due to properties of presentations or renderings, for example. Additionally, the presentation component 160 can render, determine, or generate one or more presentations or renderings based on one or more data set properties or presentation properties. These data set properties or presentation properties may include a data set summary, a property summary, a visualization property summary, a presentation capability summary, or a presentation property summary compiled by the data engine 150. In other words, the presentation component 160 may render, generate, determine, or select renderings for a data set, etc. by analyzing the data set and analyzing available renderings or visualizations to score and/or match the data set to one or more renderings, visualizations, or presentations.

Further, the presentation component 160 may render or generate renderings based on one or more device properties detected or determined by the detection component 140. For example, the detection component 140 can pass or transmit one or more of the device properties along to the presentation component 160. This means that the presentation component 160 may cause different renderings to be presented on different devices. For example, a desktop computer may render banking data with a graph which outlines actual expenditures (e.g. aggregated across one or more accounts). Here, individual account information can be secondary or tertiary to the expenditures rendering. In one or more embodiments, account information associated with one or more individual accounts may be presented on a second monitor or second display (if the desktop is equipped with the second display).

In other embodiments, such as when the desktop computer is equipped with merely one display, such account information for one or more of the individual accounts may be presented when the expenditure is selected, for example. This enables a user to view high level account information and 'drill down' into details as desired. In this way, the presentation component 160 can provide different renderings for different devices (e.g., which may be of the same device type, but have different peripherals attached or are being used in a different context) based on one or more device properties.

With reference to other devices, the presentation component 160 may generate, render, or select renderings, visualizations, or presentations based on interactive capabilities of the device (e.g., device properties). For example, a tablet with a touch screen may render banking data with a sweepable interface. That is, the expenditures rendering may be presented initially, while the account information associated with one or more of the individual accounts may be presented when a user swipes across the screen of the tablet. In one or more embodiments, the user may access the account information in greater detail by tapping on or selecting an individual expenditure, thereby providing an interface which enables the user to slide or move between renderings. In this way, the presentation component 160 can customize data presentation based on one or more device properties.

A mobile device, such as a mobile phone, may have more limited device properties. For example, the mobile device may have fewer colors, less processing power, a lower resolution display, a dial pad for input or interaction, limited battery power, etc. If a mobile device merely has a dial pad, volume buttons, and a power button for input, the presentation component 160 may observe these device properties and present a rendering in view of these features, such as a table with text entries, for example. In any event, the presentation component 160 may render one or more of the presentations, visualizations, or renderings. For example, the presentation component 160 can utilize outputs of a device, such as speakers or one or more displays of the device to render one or more of the renderings, presentations, or visualizations.

It will be appreciated that a system for data presentations, such as the system 100 can be implemented as a stand-alone system (e.g. single device or single system) or using a client-server model (e.g., where the client can be a device). In one or more embodiments, one or more functions, one or more components, or one or more features may be implemented server-side, client-side, device-side, or any combination thereof. That is, in one or more embodiments, one device may carry out or implement techniques or systems described herein. In other embodiments, one or more portions of the data presentation system may be implemented, divided, or split between one or more entities in accordance with the client-server model. This means that one or more components may be client-side, while one or more other components may be server-side. Additionally, storage, processing, computation, rendering, matching, selecting, etc. may be shifted based on a storage load (of the client, the device, or the server), a computational load (of the client, the device, or the server), one or more device properties, attributes, characteristics, peripherals, etc. Additionally, a device or client may act as a server or a go between for sessions where multiple devices are being utilized. In one example, a running session may be transferred from a first device to a second device, such as from a desktop to a tablet. In another example, a subset of data being rendered can be used to create a second level visualization or rendering, which may be presented on a separate device or additional device.

From a device standpoint, depending on device capabilities or device properties, the presentation component 160 of a device or a system 100 may render a presentation on board of the system 100 or receive a pre-rendered presentation or rendering which was generated off board. That is, in one or more embodiments, the presentation component 160 may receive renderings or presentations rather than generate the renderings or presentations. In other embodiments, the presentation component 160 can receive one or more presentation data objects from a server or third party. These presentation data objects can be utilized by the presentation component 160 or other components of a device to build or render one or more presentations, one or more renderings, or one or more visualizations.

For example, if the detection component 140 detects that a device has a graphical processing unit (GPU), the matching component 170 may have the renderings for a data set processed device-side. That is, in this scenario, the presentation component 160 may receive one or more of the presentation data objects and render one or more presentations or renderings for the data set. The presentation data objects may be received from a server or a third party. In other embodiments, other components on the device may facilitate rendering using one or more of the presentation data objects, such as the GPU, for example. In this way, the presentation component 160 can render one or more presentations for a data set based on one or more device properties. Further, the presentation component 160 can render one or more presentations, renderings, or visualizations, based on one or more data set properties of a data set. This means that the presentation component 160 can render data from the data set in a way which makes the most sense for a set of given data and hardware or software of a device (e.g., device properties) or a context of the device.

In one or more embodiments, the presentation component 160 may be implemented server side within a client-server embodiment. This means that the presentation component 160 may determine, select, or generate one or more presentation data objects, one or more presentations, visualizations, or renderings, etc. off board of a device and transmit the respective presentation data objects, presentations, visualizations, or renderings to the device. For example, the presentation component 160 can transmit one or more presentation data objects to a device that enable the device to build or render visualizations or presentations. As another example, the presentation component 160 can render or pre-render one or more of the presentations and transmit the rendered presentations or renderings to the device. In other words, the presentation component 160 can generate one or more of the presentations and transmit one or more of the presentations to the device.

In one or more embodiments, a system for data presentation, such as the system 100, can intelligently select a presentation or rendering for a data set from a pool of one or more available presentations or renderings. The matching component 170 may select renderings based on data set properties, device properties, device interface capabilities, etc. This means that the matching component 170 can determine, match, or select one or more presentations, interfaces, visualizations, or renderings (to be rendered by the device, to be received by the device, to be generated off board of the device, or to be transmitted to the device). The matching component 170 may make this determination or selection based on one or more data set properties, one or more property summaries, or one or more device properties. In other words, the matching component 170 can select a presentation or visualization based on a data set summary, one or more data set properties, a device property summary, one or more device properties, a presentation property summary, one or more presentation properties, etc. In this way, the matching component 170 may determine which presentations, renderings, or visualizations among a pool of presentations, renderings, or visualizations may be the most effective for a data set and a device.

Additionally, the matching component 170 may select a presentation or renderings based on a device context, such as a mode of a device or a state of a device. As an example, the matching component 170 may select a first subset of device capabilities or device properties to use or to be enabled when the device is in a first mode and a second subset of device capabilities or device properties to use or to be enabled when the device is in a second mode. Explained another way, if a vehicle (e.g., device) is in drive, renderings may be audio based and if the vehicle is in park the renderings may be graphical and be presented on a display which encourages user interaction, for example. As another example, if a device (e.g. smartphone) is running a workout application, the matching component 170 may infer that a user carrying the device is running. To this end, if a music video is accessed while the workout application is running, the matching component 170 may order the presentation component 160 to render the music video such that the rendering merely includes audio. For example, the audio may be generated server side or abstracted. In this way, bandwidth use and battery power may be mitigated.

The matching component 170 can also make a selection based on potential interactions or available interactions a user may have with an interface, visualization, or presentation when rendered on the device. It will be appreciated that these interactions may be available based on hardware of a device, or input peripherals of a device. For example, when a user accesses a data set using his or her mobile device (e.g. mobile phone), a presentation or visualization presented to the user may depend on or be based on whether or not the mobile device is equipped with a touch screen, an image capture component, etc. That is, if the mobile device does not have a touch screen or a click and drag-able peripheral, such as a mouse, presentations may not be presented with a rotatable viewer or swipe-able interface because the mobile device does not have the capabilities to utilize the rotatable viewer, for example. In this way, a best fit can be determined or selected from a pool of one or more presentations, visualizations, presentation options, etc.

The data set properties or property summaries may be received from the storage component 130 or the data engine 150 and the device properties can be detected by the detection component 140. Additionally, the matching component 170 can determine or select one or more presentations, visualizations, or renderings based on a pool of one or more available presentations (e.g., which may be summarized or characterized by one or more of the presentation property summaries).

Additionally, the matching component 170 can generate a score for one or more of the renderings, presentations, or visualizations. That is, the matching component 170 may score one or more of the presentations with one or more scored based on one or more of the corresponding device properties for that device. Additionally, the matching component 170 may score the respective renderings or presentations based on one or more of the data set properties. This means that a score may be indicative of how well a rendering, a presentation, or a visualization can visualize or render a data set on a device while utilizing most of the capabilities of the device. The matching component 170 or a presentation component 160 may rank or sort one or more of the presentations based on the respective scores to determine a best fit, for example. It will be appreciated that scores of presentations or visualizations may be device dependent. That is, a first presentation may score higher on a first device than a second presentation scores on the first device, while the first presentation may be scored lower than the second presentation on a second device having different device properties, for example.

Additionally, the matching component 170 can determine a best fit or matching presentation, rendering, or visualization for a device based on one or more device properties and/or one or more data set properties. This means that the matching component 170 can employ a logic engine or data engine 150 that determines the best presentation for a data set in light of, in view of, or based on properties of a device, such as device interface capabilities. As well, some presentations may be better suited for or perform more effectively when presented on a device with a certain or a specific human interface feature or device, for example. The matching component 170 can employ a matching algorithm that factors these device properties and the data set properties to select a presentation, rendering, or visualization to be presented on the device. In one or more embodiments, the matching component 170 can select a best fit rendering, visualization, or presentation from one or more available presentations, etc. based on one or more of the scores.

The matching component 170 can match data set properties (which may include visualization or presentation properties) against device properties. This enables the matching component 170 to select a desired presentation, rendering, or visualization for a data set to be presented on a corresponding device. In other embodiments, the selection of the best fit rendering may be based on a user selection, such as by presenting one or more options from the pool of presentations to the user and receiving a corresponding user response, for example.

In one or more embodiments, the presentation component 160 can generate renderings or interfaces which a user can interact with. For example, a rendering of a model may be in 3-dimensions. This rendering may be manipulated or rotated to display different views or different angles for the model. The detection component 140 can receive one or more interactions or user inputs from the device. Examples of interactions or user inputs can include gestures, grasping objects, manipulating objects, holding one or more fingers in the air, pushing, pulling, shaking, speaking, enacting, etc. For example, a user may turn his or her body in front of a motion sensor to have the presentation component 160 rotate the rendering in a similar or corresponding manner.

As an example, when a user logs into a banking interface or a general interface, account information, dollar figures, and the like may be presented to the user. Often, the user may click around or 'drill down' to find desired data or the data he or she is looking for. If the user is using a device with a motion sensor, the matching component 170 can provide an interface that makes sense in conjunction with the motion sensor. That is, the user may be able to interact with the interface or presentation by grasping objects within the interface or rendering via gesturing toward the motion sensor. Explained another way, these objects may be manipulated or interacted with via gestures using features available from a platform of the device (e.g., available via peripherals attached to the device or capabilities available to the device). In this way, the matching component 170 and the presentation component 160 of the system 100 can make information accessible and actionable (e.g. actionable intelligence) quickly for a user by generating or rendering a presentation or rendering to a user and enabling the user to interact with that presentation. This means that a user can interact with or change the way that data is presented.

The privacy component 180 can toggle between one or more security modes based on one or more of the device properties. For example, if the device is determined to be in a public setting, the privacy component 180 may set the device to be in a high security mode. Conversely, if the device is determined to be in a private setting, the privacy component 180 may set the device to be in a low security mode. As an example, when the device is in high security mode, the presentation component 160 may mask one or more portions of a rendering, presentation, or visualization. In one or more embodiments, the presentation component 160 or matching component 170 may render, generate, or select different renderings based on the security mode of the device. In other words, a different interface or rendering may be presented for the same device when the device is in high security mode versus when the device is in low security mode. One or more factors may be used to determine whether a device is in a public setting, a private setting, etc. and will be describe in greater detail herein.

In one or more embodiments, a learning component (not shown in FIG. 1) can learn preferences for renderings, visualizations, interfaces, or presentations. For example, if a user utilizes the system for data presentation 100 of FIG. 1 to access banking account information, high level summary information may be presented as a default. However, if a user 'drills down' to a specific account repeatedly, the learning component may note this habit and render a visualization, presentation, or rendering accordingly. In other words, an interface may be presented which presents details for the specific account at a top level or immediately when the user is accessing the banking account information. In this way, the learning component can tailor a rendering based on one or more user preferences, personal preferences, user behavior or other behavioral elements, user habits, an identity of the user, etc. Further, the historical preferences selected by a user may be stored for future reference. For example, if the user selects a 3-D globe view of a map over a 2-D map or selecting a bar graph over a line graph, the learning component may store those user selections and use that information for future reference or inferences.

Additionally, the learning component may consider data usage from a data plan. For example, the learning component may cause the presentation component 160 to merely render portions of an interface or rendering when it is determined (e.g. by the detection component 140) that a device is roaming and will be charged per megabyte for data usage. Other inferences may be made based on one or more user interactions with a renderings, data of the data set, one or more data set properties, device properties, etc.

Figure 2:
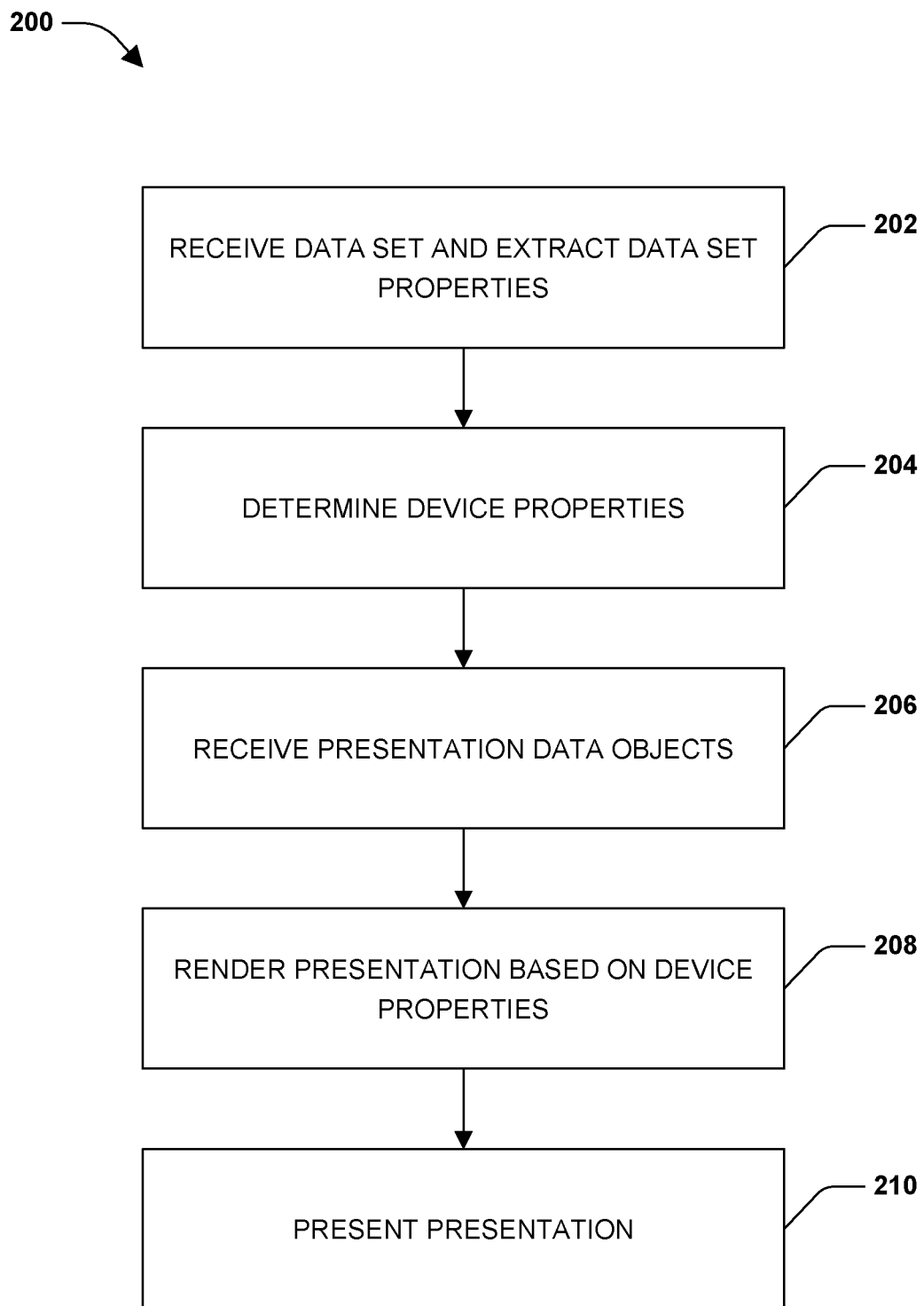
FIG. 2 is an illustration of an example flow diagram of a method for intelligent data presentation, according to one or more embodiments.

FIG. 2 is an illustration of an example flow diagram of a method 200 for intelligent data presentation, according to one or more embodiments. According to one or more aspects, the method 200 is described with reference to a device which renders presentations or renderings. At 202, a data set can be received (e.g., by a device). The data set may have one or more data set properties, which may be extracted at 202. At 204, one or more device properties may be determined. At 206, one or more presentation data objects may be received. At 208, one or more presentations may be rendered based on the presentation data objects and one or more of the device properties. At 210, one or more of the presentations may be presented.

Figure 3:
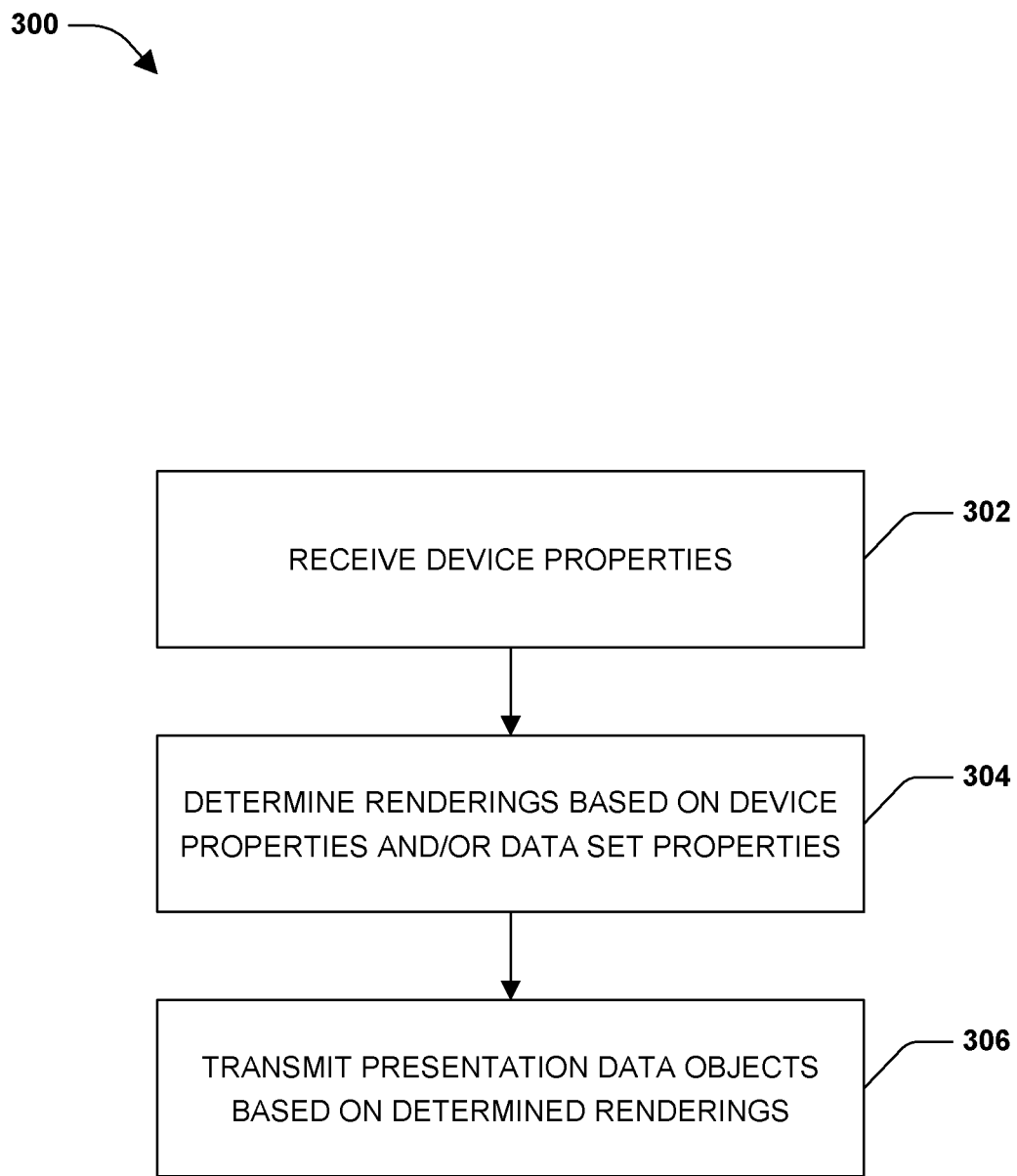
FIG. 3 is an illustration of an example flow diagram of a method for intelligent data presentation, according to one or more embodiments.

FIG. 3 is an illustration of an example flow diagram of a method 300 for intelligent data presentation, according to one or more embodiments. According to one or more aspects, the method 300 is described with reference to a server which selects a rendering for a device to render. At 302, one or more device properties of a device can be received. At 304, one or more renderings or presentations can be determined or selected based on one or more of the device properties and/or one or more data set properties of a data set being accessed by the device. At 306, one or more presentation data objects can be transmitted (e.g., to the device) based on the determined or selected renderings.

Figure 4:
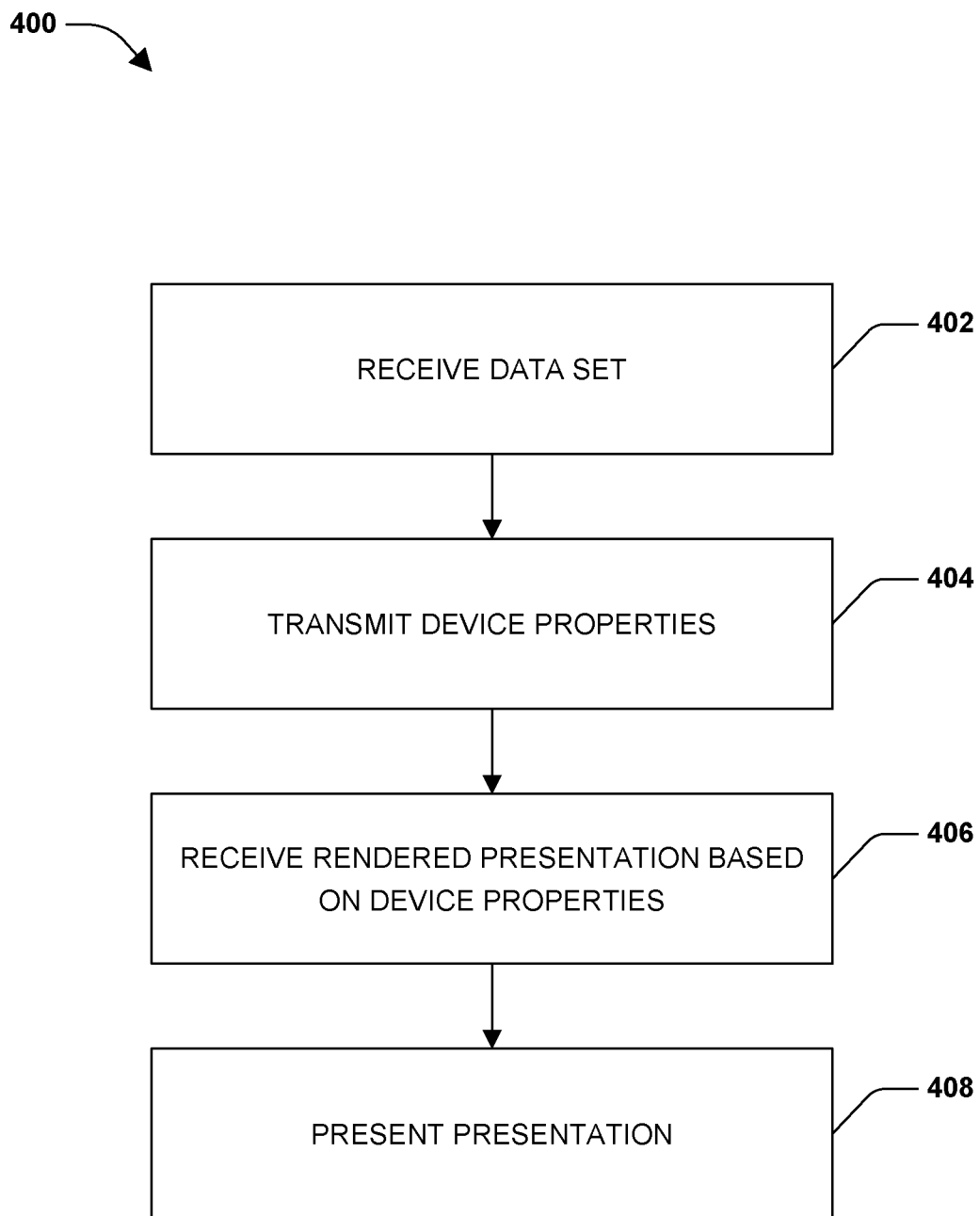
FIG. 4 is an illustration of an example flow diagram of a method for intelligent data presentation, according to one or more embodiments.

FIG. 4 is an illustration of an example flow diagram of a method 400 for intelligent data presentation, according to one or more embodiments. According to one or more aspects, the method 400 is described with reference to a device which receives rendered presentations or pre-rendered renderings. At 402, a data set can be received. At 404, one or more device properties of a device can be detected or transmitted. At 406, one or more rendered presentations may be received based on the transmitted device properties. At 408, the rendered presentation or pre-rendered rendering can be presented.

Figure 5:
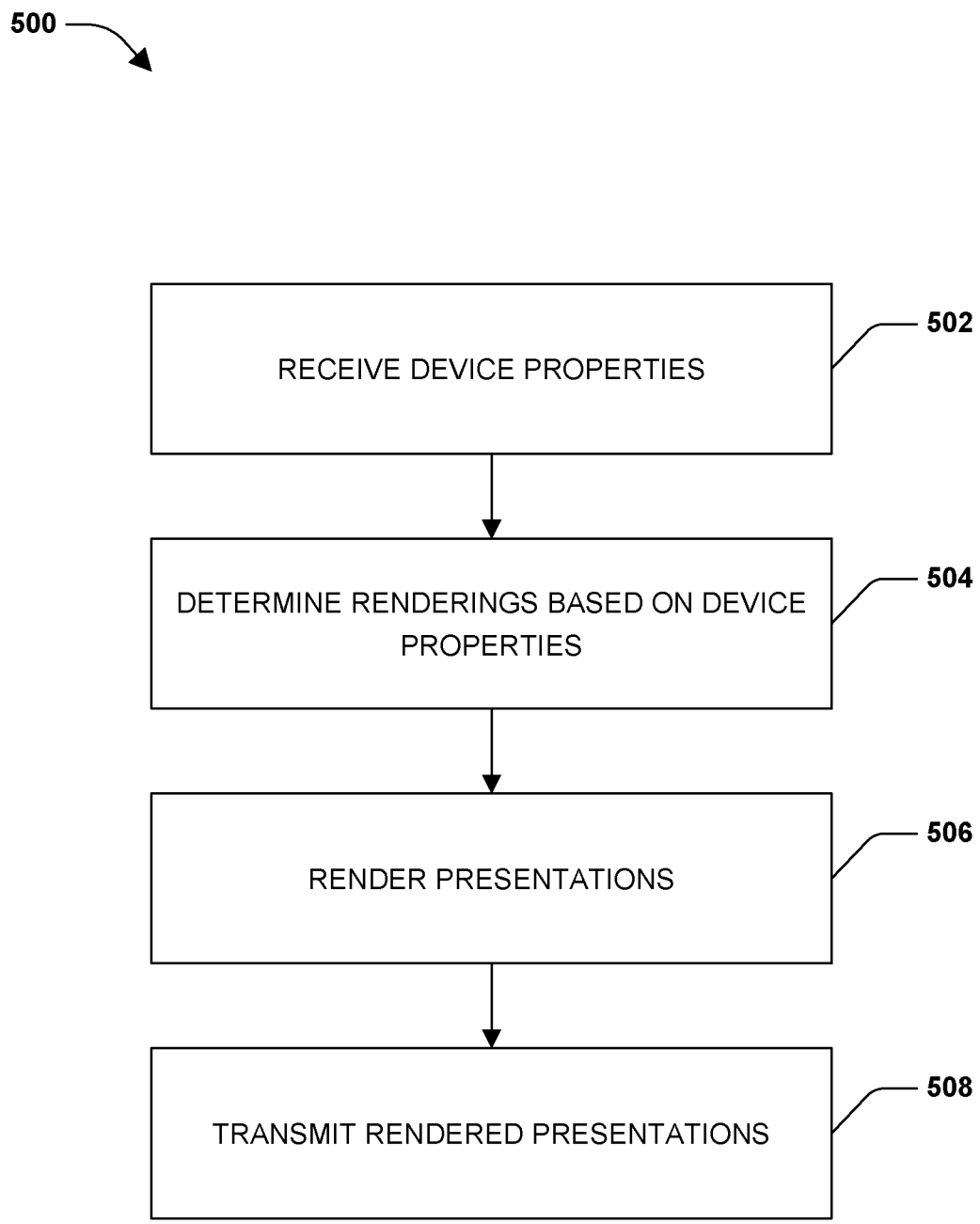
FIG. 5 is an illustration of an example flow diagram of a method for intelligent data presentation, according to one or more embodiments.

FIG. 5 is an illustration of an example flow diagram of a method 500 for intelligent data presentation, according to one or more embodiments. According to one or more aspects, the method 500 is described with reference to a server which renders presentations and transmits the rendered presentations to a device for presentation. At 502, one or more device properties can be received. At 504, one or more renderings may be determined or selected based on one or more of the device properties or one or more data set properties. At 506, one or more renderings or presentations may be generated. At 508, one or more of the rendered presentations may be transmitted (e.g., to the device for presentation).

With reference to FIG. 1, the system 100 of FIG. 1 can provide a banking interface, according to one or more embodiments. A system for providing a banking interface can include an access component 110, a data engine 150, a detection component 140, and a presentation component 160. The access component 110 can validate an identity of a user. For example, the access component 110 may match a username and a password and grant or deny access to account information (e.g., a data set associated with a username-password combination). In one or more embodiments, the access component 110 can grant, deny, or otherwise control access to account information based on other information or security features associated with a user, such as an address, zip code, telephone number, place of birth, biometrics, facial recognition, etc.

The data engine 150 can retrieve account information associated with the user. This information may be a data set including data associated with or accessible to the user, such as for an account being managed by the user, etc. The account information may be stored as part of the system, such as on a storage component 130, or stored on a server or another storage component managed by a third party. Additionally, the account information can include information, data, or a data set associated with a checking account, a savings account, a spending history, a mortgage, a wire transfer, a wire inquiry, an automated clearing house (ACH) transaction, an inquiry, etc. The account information may be associated with one or more access levels. For example, different portions of the account information may be accessed by different entities based on one or more of the access levels. The access levels may relate to different portions or databases or to read/write/modify permissions, for example. In other words, one or more data sets can include data associated with access levels for one or more entities for one or more databases.

The detection component 140 can determine one or more device properties of a device which is accessing the account information. A device may be a desktop computer, a laptop computer, a computing device, a mobile device, a smartphone, a tablet device, a tablet, a gaming console, a portable device, a handheld device, a headless device, a set top unit or set top box, a smart television, a vehicle, an ATM, an appliance, a brain computer, a brain machine, a smart watch, a digital whiteboard, a touch computer, a projection screen, a wearable computer, etc. For example, if a user is logging into a banking portal on a tablet, the detection component 140 can detect one or more device properties associated with the tablet. In this example, the detection component 140 may be able to determine a screen size of the tablet, a processing power for the tablet, a global positioning system (GPS) location for the tablet, applications or plug-ins installed on the tablet, whether or not the tablet is equipped with a graphical processing unit (GPU), a GPU property, a central processing unit (CPU) property, available memory, available computing resources, a battery level remaining, an associated data plan, connectivity characteristics, sensors on a tablet (e.g., gaze, light sensitivity, touch, temperature, humidity, pressure, accelerometer, gyroscope, compass, sensors, capacitive), communication means (e.g., Bluetooth, infrared, Wi-Fi), modes (e.g., airplane mode, quiet mode, sleep mode), etc.

The presentation component 160 can receive one or more presentation data objects based on one or more of the device properties. Presentation data objects can be used to render, generate, or present a visualization, presentation, or rendering. Because presentation data objects may be selected based on one or more of the device properties, a variety of renderings may be generated, rendered, or produced by the presentation component 160. For example, if a tablet is low on battery power (e.g., below a battery level threshold), the presentation component 160 may receive presentation data objects for rendering a text visualization, such as a table. In other scenarios, when the tablet has more battery power above the battery level threshold or when a GPU is detected, the presentation component 160 may receive presentation data objects for rendering visualizations or presentations with animation, or in high definition, for example. In this way, the presentation component 160 can receive one or more presentation data objects based on one or more device properties and render one or more portions of the account information based on one or more of the device properties and one or more of the presentation data objects.

As another example, the presentation component 160 may receive different presentation data objects to render an interface in a different manner when multiple displays are detected by the detection component 140. That is, when more screen size or display area is afforded, the presentation component 160 may render account information in greater detail, as to utilize the greater display area. When multiple displays or a large display is detected, (e.g., two or more monitors are detected, monitors with a 1920×1080 pixel resolution or greater, monitors with a display size larger than a display threshold size, such as 19") a greater amount of detail, data from a data set, or level of granularity may be rendered or presented. In this way, the presentation component 160 can render one or more portions of the account information based on a number of displays associated with a device or based on a display size associated with the device.

In one or more embodiments, the presentation component 160 can render one or more portions of account information based on one or more network characteristics associated with a device. For example, network characteristics can include data transmission speeds, available data on a data plan, etc. That is, the presentation component 160 can render one or more portions of the account information based on the data plan or available data associated with a device. This means that the communication component 120, the presentation component 160, or other components may push, transfer, transmit, or receive data as needed or as will be utilized or consumed. If a device, such as a smartphone, is running a navigation application, and a banking application is executed, a matching component 170 or the detection component 140 may infer that a user is driving, and cause one or more portions of account information to be rendered in audio format, for example. Here, the detection component 140 may determine that the device or smartphone is being utilized in a navigational context. In other words, one or more of the device properties may be determined to be that the smartphone is navigating. To this end, because the smartphone is navigating, an inference may be drawn (e.g., by the matching component 170) that visual interfaces or renderings may not be as useful. Accordingly, presentation data objects received by the presentation component 160 may be assembled to render an audio presentation or rendering.

Additionally, the presentation component 160 may render one or more portions of account information based on a GPS location of the device. For example, if a user accesses account information at a coffee shop and a transaction history associated with the account information indicates that the user has made a purchase at the coffee shop, the presentation component 160 may render a general banking interface with a link relevant to coffee usage for the user (e.g., based on the transaction history and the GPS location). Here, information associated with coffee purchases over a period of time, how much money could be saved if the user mitigated or reduced spending on coffee, etc. could be presented.

In one or more embodiments, the system for providing the banking interface may receive pre-rendered information. That is, the system may receive renderings or rendered presentations, rather than presentation data objects to be rendered. For example, the presentation component 160 can receive one or more portions of rendered account information or pre-rendered account information based on one or more device properties, which may be detected by the detection component 140. The detection component 140 may transmit one or more of these device properties to a server. Additionally, the presentation component 160 can present one or more portions of the rendered account information.

According to one or more aspects, the system for providing the banking interface may provide a corporate banking interface (e.g., a commercial electronic office portal). Here, the presentation component 160 may receive presentation data objects to render account information, reports, etc. That is, the presentation component 160 can generate or receive one or more reports for one or more portions of the account information. A report can be indicative of performance associated with an account, intra-day balance changes, inter-day balances, recommendations, suggested actions, etc. The presentation component 160 can render the account information or a corresponding interface based on device properties. Additionally, the presentation component 160 may render interfaces or presentations which illustrate information in at-a-glance formats or a summary format using visualizations to facilitate understanding of the summary.

In one or more embodiments, a user may interact with one or more portions of a rendering or an interface. For example, the detection component 140 can receive one or more user interactions with a device. These user interactions may be captured as a gesture by an image capture component or a motion sensor, a touch input, a keystroke, a mouse input, a voice command, etc. For example, the presentation component 160 may generate one or more reports in response to an inquiry received via a gesture, such as a selection made by waving a hand or a finger or by speaking a voice command.

As another example, the corporate banking interface may include an interface for managing authorizations (e.g., account level, product level, functional level, department level, entity level, super user, approver, creator, user, etc.). Here a list of employees, people, contractors, or other entities may be listed or organize-able by groups. If the detection component 140 detects that a motion sensor is connected or available on a device, a gesture based interactive interface may be provided or rendered. For example, individuals or entities may be selected or grouped using gestures and moved, dragged, manipulated, etc. by dragging and dropping them in buckets or boxes (e.g., a bucket or a box may represent a subset of access properties or a grouping of access properties).

In this way, authorization levels may be assigned to multiple users or a plurality of users via an interactive gesture interface, thereby making interaction with one or more portions of a rendering or presentation possible. Here, the data engine 150 may detect the type of data being received (e.g., a list of names or entities and associated authorization levels or other data set properties). In response, the presentation component 160 may render the interface based on those data set properties and/or one or more of the device properties (e.g., a motion sensor or motion sensing capabilities of the device or provided via attached peripherals). The storage component 130 may cross reference authorization levels with termination records (e.g., of a database) and provide alerts when an individual is terminated, but still has access to account information, for example.

As another example, one or more gestures received by the motion sensor may replace actions available via a mouse or keyboard. In one or more embodiments, additional user interactions may be available based on one or more of the device capabilities. For example, when a motion sensor detects a user is holding one finger up, the presentation component 160 can render a presentation or a report associated with a first account. When the motion sensor or image capture component detected that a user is holding two fingers up, the presentation component 160 may render information associated with a second account.

Further, a user may interact with an interface or presentation by providing one or more hypothetical situations or hypothetical scenarios to the data engine 150. For example, a user can inquire about a current state of his or her finances, how much remains in a budget, whether or not he or she can afford an item, suggestions as to where budget cuts could be made, etc. In one or more embodiments, the presentation component 160 can present one or more financial products (e.g., loans) based on one or more of the hypotheticals, queries, or inquires. Here, the data engine 150 can receive a current scenario, hypothetical scenario, etc. from a user and the presentation component 160 may render one or more presentations or renderings based on the hypothetical scenario.

Figure 6:
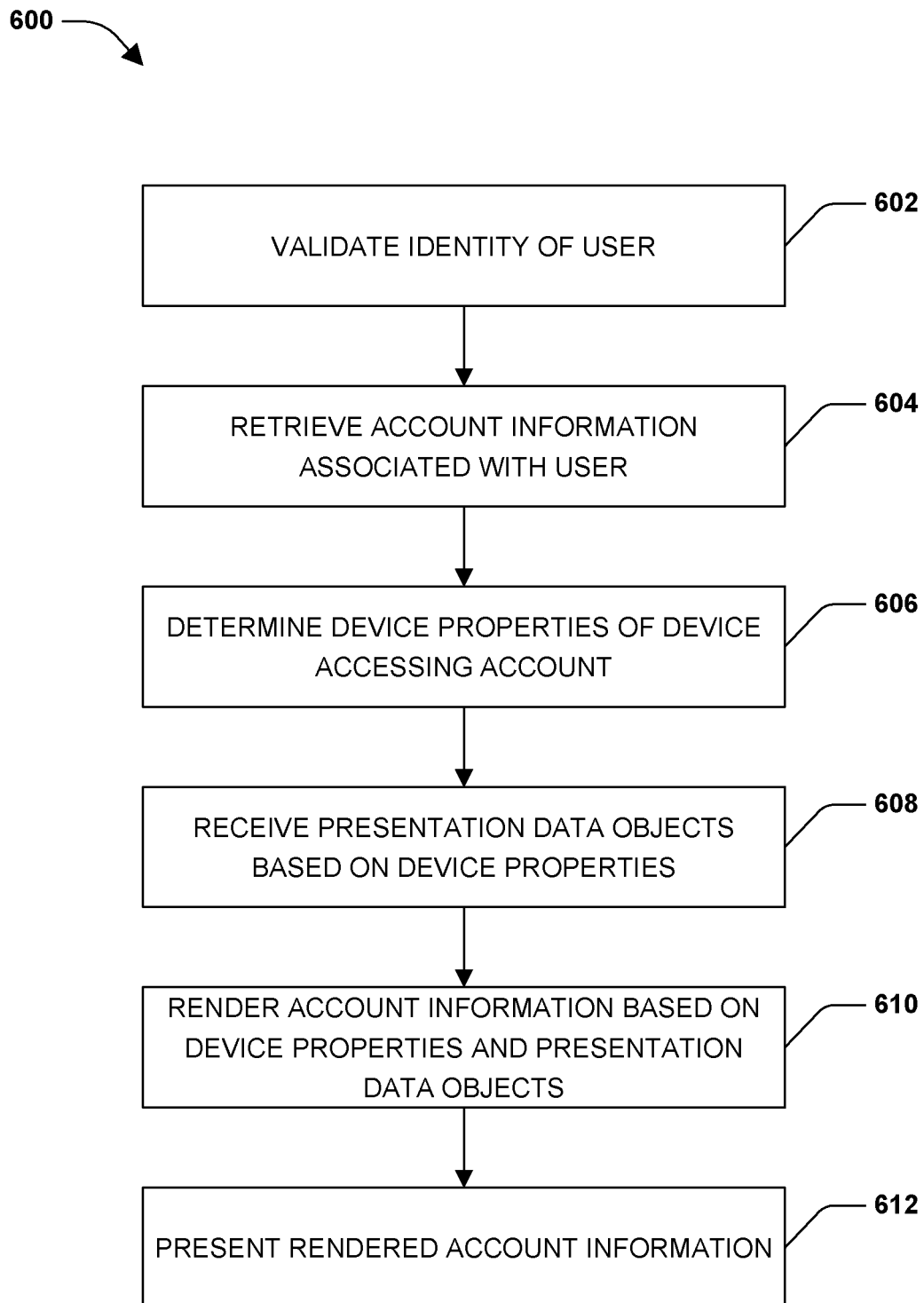
FIG. 6 is an illustration of an example flow diagram of a method for providing a banking interface, according to one or more embodiments.

FIG. 6 is an illustration of an example flow diagram of a method 600 for providing a banking interface, according to one or more embodiments. At 602, an identity of a user can be validated. At 604, account information associated with the user can be retrieved. At 606, one or more device properties of a device accessing the account can be determined. At 608, one or more presentation data objects can be received based on one or more of the device properties. At 610, account information can be rendered based on one or more of the device properties and one or more of the presentation data objects. At 612, the rendered account information can be presented.

With reference to FIG. 1, the system 100 of FIG. 1 can provide a function based interface, according to one or more embodiments. In one or more embodiments, the function based interface can be a sales interface for internal or external use. In other embodiments, the function based interface can be used for tracking time, etc. The system 100 can include one or more databases (e.g., which may be stored on the storage component 130), an access component 110, a data engine 150, a detection component 140, and a presentation component 160.

As an example, a sales interface can be rendered to present data associated with one or more data sets for a customer or client, thereby providing a salesperson a preparation tool which may be reviewed prior to, during, or after a sales call with a customer or client. Here one or more databases may house or store information or data sets (e.g., having one or more data set properties) related to one or more customers or clients. In other words, one or more data sets can include data associated with one or more existing clients, one or more potential clients or leads. The access component 110 can validate the identity of the salesperson the data engine 150 can retrieve one or more data sets relevant to an upcoming sales call for the salesperson. For example, the salesperson may utilize a device, such as a mobile device, to submit an inquiry pertaining to a customer, where the purpose of the inquiry is for an upcoming sales call to that customer. To this end, the data engine 150 can retrieve one or more data sets associated with that customer based on the inquiry and the identity of the salesperson. The detection component 140 can determine one or more properties of the device which the salesperson is using to inquire about the customer.

For example, if the salesperson is using a mobile phone, screen size, a number of characters which can fit on the screen, and bandwidth may be among the device properties which are detected by the detection component 140. The data engine 150 may determine presentations, renderings, or visualizations useful for visualizing or comprehending customer data sets bay analyzing patterns, information, or details about the customer from one or more of the data sets. In other embodiments, this analysis may be conducted off board, such as on a server, for example. In this way, leads, repeat customers, potential customers records or historical data can be summarized and accessed by the salesperson with few clicks, or 1-click (e.g., a tell me about this customer button on the interface). This enables a salesperson to access information about a lead prior to, during, or after a sales call, thereby facilitating effective presentation of data sets to the salesperson. As a result of the renderings provided, the function based interface can mitigate the amount of preparation time the salesperson spends prior to a call.

The presentation component 160 may provide one or more suggestions for the salesperson. For example, the data engine 150 may recognize that a relatively similar amount is withdrawn from a corporate account on a weekly, bi-weekly, or semi-monthly basis. Based on this observation, the data engine 150 may infer that the amount withdrawn is spent on payroll for the corporation or company. Here, the presentation component 160 may suggest that the salesperson pitch a payroll system to a lead associated with the company if the company is not already using the payroll system. In this way, actionable intelligence can be provided for a salesperson (e.g., via one or more of the suggestions).

Additionally, the presentation component 160 can receive one or more presentation data objects based on one or more device properties and/or one or more data set properties. This means that different renderings, visualizations, or presentations may be generated across different devices. For example, if a salesperson is accessing a presentation to prepare for a telephone call with a sales lead, a first rendering may be presented on a first device, such as a flip phone, while a second rendering may be presented on a second device, such as a smart phone. In this way, the presentation component 160 can render or present one or more interfaces which include one or more data sets or retrieved data sets.

In one or more embodiments, the rendering can be based on one or more of the presentation data objects or one or more received renderings. This means that the renderings may be rendered device-side or off board of the device, such as server-side, for example. Further, the rendering generated by the presentation component 160 can be based on an identity of a user. The identity of the user can include a job title, job function, a position, etc. This means that the same data from a data set may be presented differently depending on who is viewing the data. In this way, a job function of a user can be used to determine the content presented within an interface, thereby making the interface 'function based'.

As previously mentioned, salespeople are generally concerned with preparing for sales calls with potential leads or repeat customers. Accordingly, the data engine 150 and the presentation component 160 may render interfaces which identify one or more products which can be pitched by the salesperson to the lead. For example, the data engine 150 may aggregate relevant customer data sets from one or more databases. A matching component 170 may match potential needs, unfulfilled needs, or needs fulfilled by other providers with one or more available products, such as loans, payroll systems, foreign exchange systems, wire systems, etc. The presentation component 160 can suggest one or more of the available products to a lead based on the identity of the user having a position in sales. On the other hand, manager viewing the same data or data set may be presented with an entirely different interface. For example, the presentation component 160 may identify performance on a per salesperson basis, present client or lead information at a higher level view (e.g., potential revenue generated, revenue generated per salesperson), etc.

One or more reports may be generated by the presentation component 160 for one or more data sets based on an inquiry from the user. For example, a salesperson can send a request for business activity of a lead within a time frame. The data engine 150 can receive this request, compile one or more corresponding data sets and have the matching component 170 determine one or more presentations suitable for presentation based on one or more device properties of the device used to transmit the request for the report. Similarly, one or more of the reports can be generated based on an identity of the user. In this way, information from a data set can be presented in a fashion which is relevant to the user. For example, a manager may not be as concerned with products which can be pitched to leads as an amount of revenue being generated by a salesperson or a customer. Accordingly, this may be taken into account when generating or rendering presentations or visualizations.

As another example, a report may include status information associated with an inquiry from a user (e.g., a status request for a wire transfer). Here, a rendering of a real time tracking of the wire request can be provided based on the inquiry from the user and the identity of the user. This means that because the user submitted a status check on his or her wire and the user is a customer, a particular rendering may be provided to enable the user to track the status of the wire. Conversely, the same data set pertaining to the wire transfer may be rendered differently for a customer service representative (CSR) based on the different identity for the CSR. In this way, data from one or more data sets can be rendered differently and consumed in different ways for different experiences.

It will be appreciated that data sets or data can be dynamic or fluid. In other words, this means that a data set can change on the fly. For example, wire data may be in the form of text fields, which are continuously appended or updated. Here, the data engine 150 could accept wire data or a wire data set and one or more updates associated with the wire. Initially, merely point of exit information may be available or provided for the data set. Here, the presentation component 160 may render a visualization or rendering having the point of exit for the wire. If a comment is added or appended to the text field, the data engine 150 or the presentation component 160 may re-render, extend, or modify a visualization, presentation, or rendering to correspond to the change in the wire data or associated text field. The data engine 150 can analyze one or more portions of the wire data or data set and distinguish between substantive data and extraneous or unnecessary data. As an example, when additional columns or additional rows are added to a data set, the data engine 150 can determine whether the additional data is relevant. The data engine 150 can consider a number of factors, such as a number of wires being sent, an amount being transferred, a comparison between exchange rates, exchange rate over time, etc. Additionally, the presentation component 160 may update rendering, visualizations, or presentations with the updated data set. Further, the matching component 170 may select or re-evaluate which visualization, rendering, or presentation will be utilized from a pool of one or more available presentations thereafter.

In one or more embodiments, a function based interface may be provided to track time. For example, an associate can login to a system via the access component 110 and view a data set, such as time logged or billed for the year. The storage component 130 may house the data set and the data engine 150 may retrieve it. Here, an identity of the user can be determined by the access component 110. The presentation component 160 may render one or more presentations for the associate to determine whether that associate is on track to bill a number of hours or meet a quota, etc. When a manager of the associate logs in to the same system, the access component 110 may pass the identity of the manager to the presentation component 160, which may determine a different rendering to be presented. For example, the rendering presented to the manager may include efficiency rates of the associate or a comparison between that efficiency rate and other employees in a similar position or similar level. In this way, the presentation component 160 or the data engine 150 can select renderings or presentations best suited for the entity consuming the rendering. In other embodiments, one or more of the data sets can include data associated with inventory levels, etc. For example, merchants could utilize the function based interface to determine which products were selling and which were not. Here the presentation component 160 can select renderings suited for a sales scenario.

Figure 7:
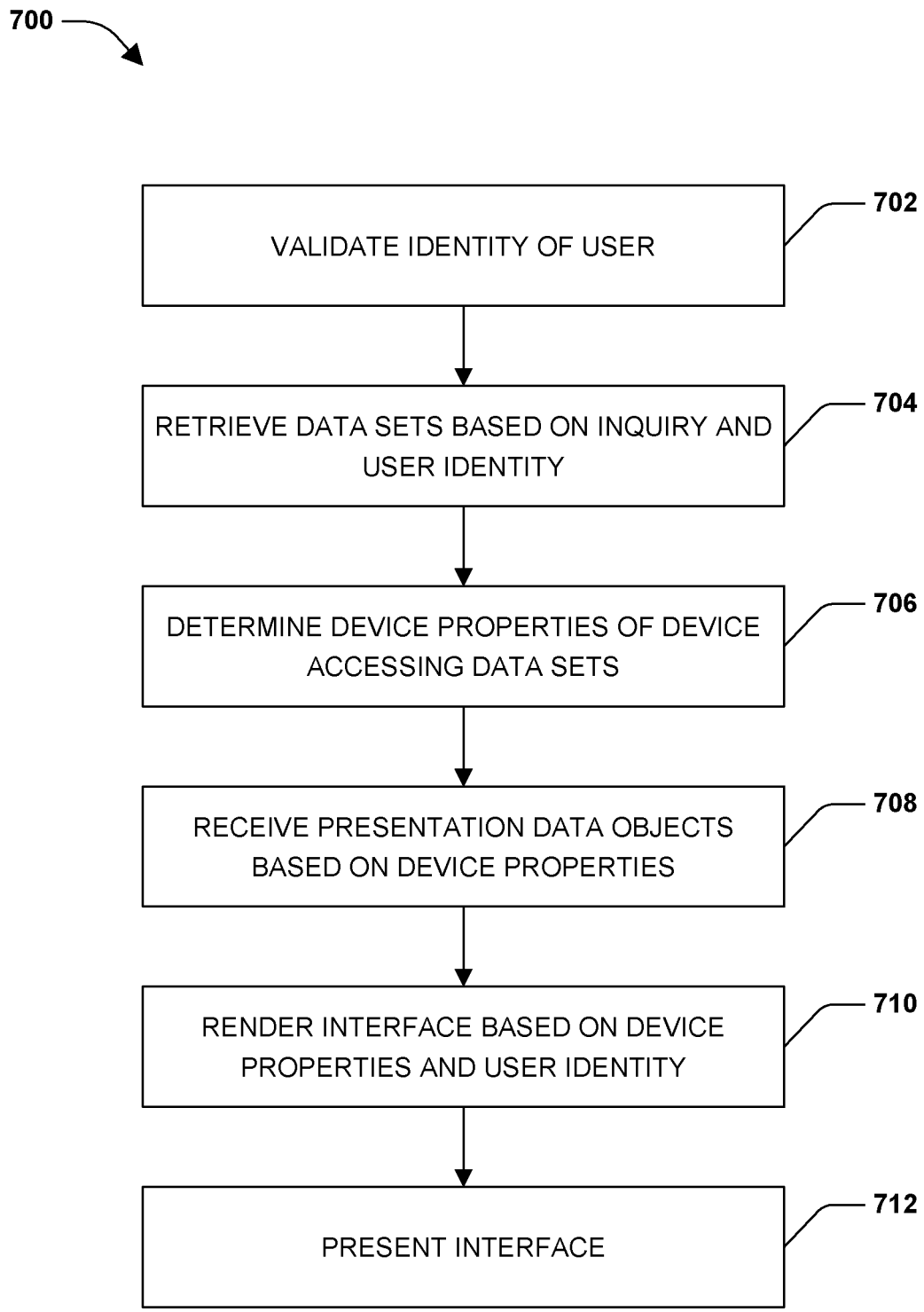
FIG. 7 is an illustration of an example flow diagram of a method for providing a function based interface, according to one or more embodiments.

FIG. 7 is an illustration of an example flow diagram of a method 700 for providing a function based interface, according to one or more embodiments. At 702, an identity of a user can be validated. At 704, one or more data sets may be retrieved based on an inquiry and an identity of a user. At 706, one or more device properties may be determined. At 708, one or more presentation data objects can be received based on one or more of the device properties. At 710, an interface can be rendered based on one or more of the device properties and the identity of the user. At 712, the interface can be presented.

Figure 8:
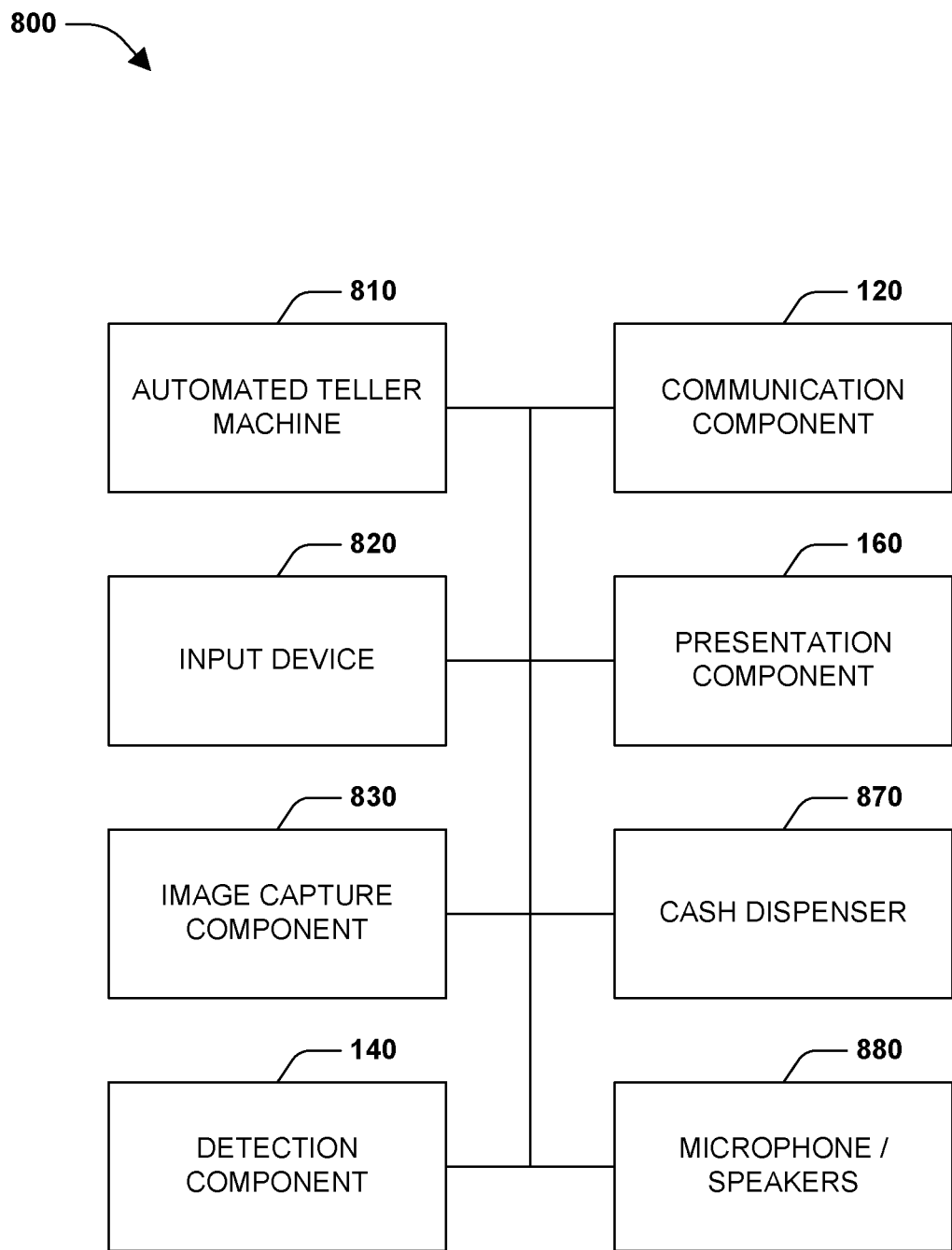
FIG. 8 is an illustration of an example system for interfacing with an automated teller machine (ATM), according to one or more embodiments.

FIG. 8 is an illustration of an example system 800 for interfacing with an automated teller machine (ATM), according to one or more embodiments. The system 800 can include an automated teller machine (ATM) 810, an input device 820, a detection component 140, and a presentation component 160. In one or more embodiments, the system 800 can include an image capture component 830 which can detect one or more user interactions with the ATM 810. The detection component 140 can determine one or more capabilities of the ATM 810 or one or more properties of the ATM 810 and render an interface for the ATM 810 accordingly. For example, the detection component 140 can determine whether an ATM 810 is equipped with infra-red sensors, motion detectors, Bluetooth, near-field communication (NFC), Wi-Fi Direct, an image capture device, a touch screen, speaker, microphone, etc. The system 800 can include a communication component 120, a cash dispenser 870 for dispensing funds, a microphone and/or speakers 880, a deposit slot for accepting one or more deposits, a card reader for accepting one or more banking cards.

Additionally, the detection component 140 can detect one or more of the user interactions with the ATM. That is, the user interactions are not necessarily received via the input device 820, which can include a touch screen, keypad, buttons, etc. Here, one or more of the user interactions may be received or captured when the user gestures at the image capture component 830, for example. That is, user interactions can include gestures, waves, raising fingers, etc.

In one or more embodiments, when the detection component 140 determines that the user is interacting with the ATM 810 via the image capture component 830, the presentation component 160 can render one or more advertisements on a display of the ATM. That is, the presentation component 160 can render advertisements based on one or more of the user interactions, such as a gesture associated with withdrawing money, for example. The presentation component 160 may also render account information for the user based on one or more of the user interactions. Further, the presentation component 160 may facilitate processing of one or more transactions based on one or more of the user interactions. For example, when a user withdraws money or funds, an account balance may be displayed. Transactions can include a transfer of funds, a withdrawal of funds, etc.

The presentation component 160 can generate or render portions of an interface or renderings based on one or more user interactions with a device, ATM, etc. For example, when a user selects an option within an interface or a rendering, different portions of an interface may be presented. The presentation component 160 can also generate presentation interaction data based on one or more of the user interactions. For example, the presentation component 160 can render a pointer based on gestures or a location of a detected finger or hand (e.g., received by a motion detector or image capture component 830). When motion detection is being utilized to gather or receive one or more of the user interactions, one or more advertisements can be presented by the presentation component 160. In this way, advertisements may be presented when a user is using a mobile device to interact with the ATM 810 or gestures to interact with the ATM 810. In one or more embodiments, one or more components, such as the image capture component 830, a touch sensor, the input component 820, etc., can be utilized to determine whether or not a user is interacting with the input component 820. User interactions may be mapped to one or more transactions, such as withdrawing money or funds, displaying a balance, printing a balance, adjusting an audio volume, enabling narration or reading text aloud, etc.

In one or more embodiments, the system 800 can be implemented with one or more security features. For example, the image capture component 830 can capture one or more images or frames of an environment around an ATM 810 and determine a number of individuals within a captured frame. To this end, the presentation component 160 can render account information of the user based on a number of individuals within the frame or the number of individuals detected within the frame. That is, if multiple individuals are detected, the presentation component 160 may render less detailed or sensitive account information. If merely one individual is detected, the presentation component 160 may render additional account information for the user. In other embodiments, the microphone and/or speakers 880 can be utilized to determine a number of distinct voices and the presentation component 160 can render account information in a similar fashion.

Similarly, the detection component 140 can detect whether a headphone jack is plugged in or an ambient noise level to determine a volume for narration or whether narration should be enabled or not. For example, if the user is interacting with the ATM 810 via a mobile device or application installed thereon, the detection component 140 can detect whether or not headphones are plugged into the mobile device and render audio associated with account information for the user accordingly. In other words, if the detection component 140 detects that no headphones are plugged into the headphone jack of the mobile device, the presentation component 160 may disable narration in response to the lack of headphones. The presentation component 160 may alternatively adjust a volume of narration based on an ambient noise level.

In one or more embodiments, the system 800 can include a communication component 120 for receiving one or more user interactions with the ATM 810. For example, the system 800 can be coupled to a device, such as a mobile device, mobile phone, tablet, smartphone, etc. The device may have a banking application installed thereon, wherein the banking application receives one or more user interactions and transmits one or more of the user interactions to the communication component 120 of the ATM 810. In other words, a user may be able to execute one or more transactions on an ATM 810 by installing and running an application on a mobile device. An access component, such as the access component 110 of FIG. 1 may grant a user access to one or more accounts or account information associated with login information associated with the application or banking application.

When a user interacts with an ATM 810 via a device which transmits user interactions to a communication component 120 of the ATM 810, the presentation component 160 can render one or more advertisements on a display of the ATM because account options or available transactions can be viewed on a display of the device (e.g. smartphone). In other words, the presentation component 160 can render one or more of the advertisement based on one or more remote user interactions. Stated yet another way, advertisements may be presented when no user interactions are received from the input device 820 of the ATM 810.

The system 800 can include speakers and a microphone 880 for presenting one or more portions of account information or available options in an audio format. The microphone 880 can be utilized to determine an ambient noise level. A volume for the speakers or audio renderings may be determine based on the ambient noise level.

In one or more embodiments, one or more portions of the system 800 of FIG. 8 can be implemented in part on a device or mobile device. The system 800 can facilitate interfacing with an ATM. The system 800 can include a communication component 120 for coupling a device with an ATM. For example, a user can install a banking application on his or her phone or mobile device, login to the banking application, and access funds from an ATM by interacting with the mobile device rather than an input device, such as input device 820 of an ATM 810.

The system 800 can include a detection component 140 for detecting one or more user interactions with the ATM and a presentation component 160. For example, the detection component 140 can receive user interactions through a touch screen on the phone, by making gestures at an image capture component of the device, speaking, typing on the device, etc. The presentation component 160 can render account information based on one or more user interactions and transmit one or more transaction requests to the ATM based on one or more of the user interactions.

The detection component 140 can include an image capture component 830 which can determine a number of individuals within a frame. Additionally, the system can include a privacy component (not shown) for selecting a high security mode or a low security mode based on the number of individuals detected within the frame. The presentation component 160 can render the account information based on the selected security mode. When multiple individuals or entities are detected, sensitive account information may be masked, hidden, or not displayed on a display of the device or mobile device. When merely one individual is detected, additional or all account information may be displayed on the device or mobile device.

Figure 9:
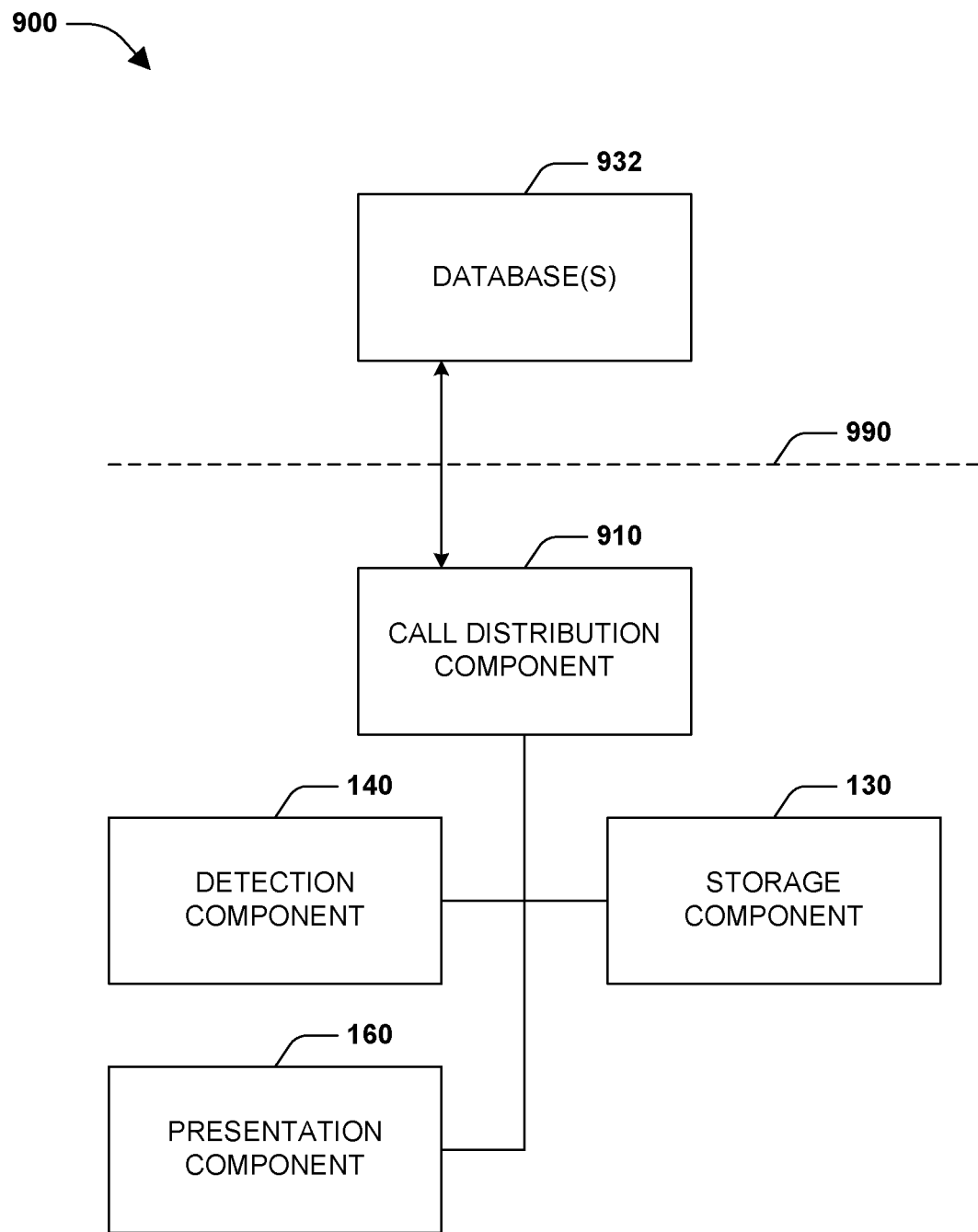
FIG. 9 is an illustration of an example system for providing a call center interface, according to one or more embodiments.

FIG. 9 is an illustration of an example system 900 for providing a call center interface, according to one or more embodiments. For example, a data presentation system, such as the system 100 of FIG. 1 can be implemented to enhance call center efficiency by providing a call center interface. Here, a system 900 for providing a call center interface is provided. The call center interface may include or present renderings, visualizations, or presentations to a customer service representative (CSR) such that the CSR has customer information (e.g., a customer data set) relevant to a customer's call, customer data, customer history, product data, root cause of a problem, estimated down times, etc. This enables the CSR to provide a customer with relevant information while the customer is on the line with the CSR. Additionally, the call center interface may help prepare a CSR prior to being connected with a customer by presenting the CSR with renderings of customer data.

The system 900 can include a call distribution component 910, a detection component 140, a presentation component 160, or a storage component 130. In one or more embodiments, the system 900 may access one or more databases 932. The call distribution component 910 can manage one or more incoming calls from one or more customers. The call distribution component 910 can transfer one or more of the incoming calls to the CSR device or manage one or more of the incoming calls. The call distribution component 190 can distribute one or more of the incoming calls based on linear call distribution, circular call distribution, uniform call distribution, simultaneous call distribution, or weighted call distribution. The storage component 130 can track, store, or house data or data sets, which may include server logs, interactions between systems which can affect customers. That is, the storage component 130 can store one or more logs associated with one or more of the customers. For example, one or more of the logs can include a server status, wait time data, call time data, queue data, customer satisfaction data, interactive voice response (IVR) data, or path data associated with one or more of the customers.

The presentation component 140 can render or generate renderings, visualizations, or presentations for a call center interface which promotes improved customer service. This means the presentation component 160 can render the call center interface based on one or more of the logs, thereby providing the CSR with relevant information about a customer. For example, renderings may include data related to a call time, a queue, wait times, estimated down times, customer satisfaction levels, etc. By providing this information to the CSR via the call center interface, the CSR will have more relevant information accessible quickly to solve a customer's problems or questions.

For example, the presentation component 160 may present a CSR with a visualization which illustrates a path that a customer has taken through an interactive voice response (IVR) system and/or one or more potential issues which may be a reason the customer is calling based on the path that the customer has taken through the IVR (e.g., based on one or more customer responses to prompts in the IVR). If a customer is calling with regard to an error related to his or her account (e.g. caused by a server failure unknown to the customer), the interface may be presented with a visualization or presentation indicative of the server failure, interaction options with the customer, a trouble ticket shortcut, and an estimated response time.

In other embodiments, the call center interface can include a rendering which prompts a CSR to actively inform the customer of the problem before the customer calls in to the call center. As an example, if a customer attempts to access their account and receives an error notification, a CSR could be presented with a visualization representing a list of customers affected by the problem and proceed to alert those customers of the error (e.g., by a telephone call, a text, an email, etc.).

The detection component 140 can determine or detect one or more device properties of a CSR device which the CSR is using to receive calls. Device properties may include a number of displays or monitors available, associated with, or connected to the CSR device, whether or not a headset is connected, screen size, etc. Visualizations, renderings, or presentations may be presented differently to a CSR depending on device properties of a device the CSR is using. This means that the presentation component 160 can render the call center interface or associated visualizations, renderings, etc. based on one or more device properties of the CSR device. For example, when multiple monitors or displays are detected by the detection component 140, one or more subsets of data from data sets may be presented on different displays. In other words, the interface may be customized based on the number of displays available to the CSR. The presentation component 160 can render a first subset of data from one or more of the logs on a first display associated with the CSR device and a second subset of data from one or more of the logs on a second display associated with the CSR device when two or more displays are associated with the CSR device.

The system 900 for providing a call center interface can build the call center interface such that it is interactive based on one or more device properties of a device being used by the CSR to handle calls. In other words, a CSR can interact with the call center interface based on hardware, software, peripherals, or context of a CSR device, such as a computer running the call center interface. The CSR device may include peripherals, such as a mouse or keyboard. As an example, if the CSR device may include an image capture component or a motion sensor, one or more gestures can be received. In one or more embodiments, the call center interface can initiate one or more call center operations based on one or more of the gestures. Additionally, the call center interface may be customized; that is, the presentation component 160 can modify, render, or re-render the call center interface based on one or more of the gestures. That is, a CSR can manipulate objects, locations, or layouts associated with the call center interface by making gestures in view of the motion sensor or image capture component. The storage component 130 may update or modify one or more of the logs based on one or more of the gestures.

In other embodiments, the presentation component 160 can render a pointer based on one or more gestures, such as a location of a hand or a finger. In other words, a CSR can use his or her hand, finger, or arm to 'physically' or 'virtually' interact with the call center interface to facilitate one or more call center operations. The system 900 may include an image capture component or motion sensor which receives one or more gestures from a CSR utilizing a CSR device. A presentation component 160 may render a call center interface based on one or more CSR device properties detected by a detection component 140. Further, the presentation component 160 can render one or more portions of the call center interface based on one or more of the gestures. For example, the presentation component 160 could render a pointer within the call center interface based on a position of a CSR's hand or arm. Other gestures may be configured to facilitate other call center operations, such as placing a caller on hold by holding a hand up, moving between calls or transferring calls with a swipe, hanging up by making a downward motion, etc. The call distribution component 910 can manage one or more incoming calls based on one or more gestures. For example, queues may be rearranged (e.g., transferring a caller or customer from a first queue to a second queue) based on a swipe.

The detection component 140 can detect one or more gestures based on gaze detection. For example, an image capture component can determine where the CSR's eyes are focused and have the presentation component 160 render a pointer based on the location where the eyes focus. In this way, call center operations can be improved.

Figure 10:
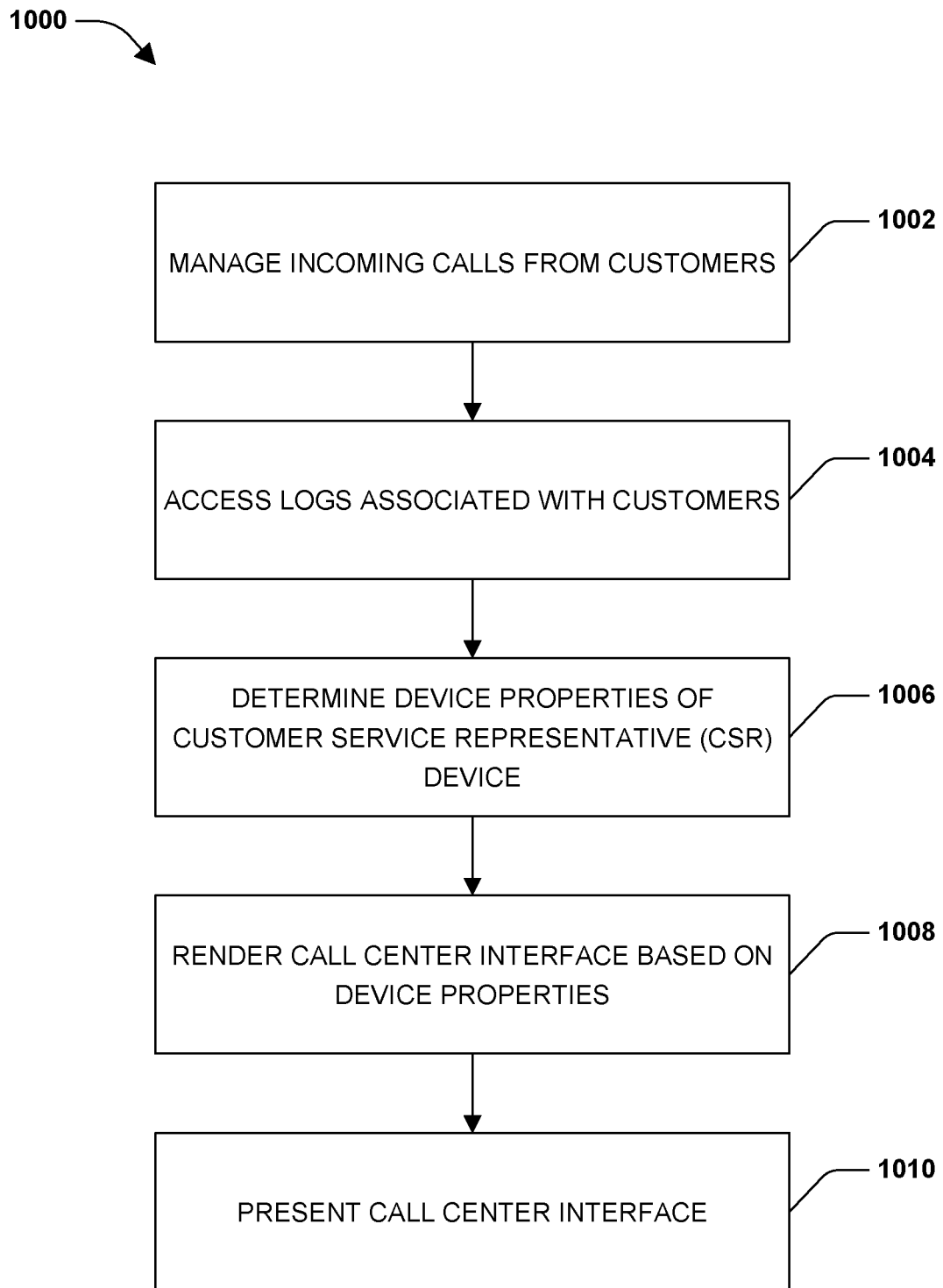
FIG. 10 is an illustration of an example flow diagram of a method for providing a call center interface, according to one or more embodiments.

FIG. 10 is an illustration of an example flow diagram of a method 1000 for providing a call center interface, according to one or more embodiments. At 1002, one or more incoming calls from one or more customers can be managed or routed. At 1004, one or more logs associated with one or more of the customers can be accessed. At 1006, one or more device properties can be determined for a CSR device. At 1008, a call center interface can be rendered based on one or more of the device properties. At 1010, the call center interface can be presented.

With reference to FIG. 1, the system 100 of FIG. 1 can provide a vehicle interface, according to one or more embodiments. That is, a system for data presentation can be implemented within a vehicle. In other words, the vehicle can be the "device" which a user or occupant is using to access data. Here, information or data can be rendered on a display of the vehicle or presented in an auditory fashion (e.g., through speakers equipped on the vehicle).

In one or more embodiments, a user, driver, or occupant can access financial information, such as personal bank account information by logging into a banking interface via the access component 110, which verifies an identity of the user. Here, the communication component 120 may receive one or more data sets associated with account balances, etc. for the user. The detection component 140 may determine one or more capabilities, device properties, or vehicle properties for the vehicle, such as a display size, for example. The data engine 150 may determine one or more data set properties and pass the data set properties on to the presentation component 160 which can render one or more of the data sets based on the data set properties and the vehicle properties. The matching component 170 may select a rendering from a pool of one or more available renderings and have the presentation component 160 render that rendering or receive that rendering from a third party. The presentation component 160 can display a rendering of the financial data accordingly via an automobile interface.

It will be appreciated that the automobile interface, associated renderings, presentations, or visualizations may be based on one or more characteristics, attributes, properties, or a context of the vehicle. As an example, while a vehicle is parked, visualizations may be presented to a user in an interactive or visual manner. In other words, the presentation component 160 may render visual or interactive renderings or interfaces. However, when the vehicle is in motion, in drive, or when a user is driving the vehicle, audio portions of a presentation may be emphasized rather than visual portions of the presentation. This may mean that the audio interface may merely include audio when the vehicle is in drive. In this way, distractions can be mitigated for the driver or operator of the vehicle.

In one or more embodiments, passengers or other occupants of the vehicle may engage or interact with the automobile interface, rendering, a presentation, or a visualization while the vehicle is in motion or the driver is driving the vehicle. For example, a seat belt sensor can be utilized to detect whether or not a passenger is occupying a passenger seat of a vehicle. When no passenger is detected, visual interaction between a user and one or more portions of a presentation may be disabled, for example. In other words, access to one or more portions of a visualization may be controlled based on a position of the user within the vehicle. Stated yet another way, one or more visualizations or presentations may be presented based on whether a driver or a passenger is accessing the data set.

The system 100 can be configured to screen personal or sensitive data from unauthorized users. As an example, if a user is signed into (e.g., authorized) his or her online banking interface, a privacy component 180 can detect additional occupants in a vehicle and render data, visualizations, presentations, or the automobile interface accordingly. The privacy component 180 or the access component 110 can detect the presence of passengers, unauthorized users, additional occupants, etc. by utilizing weight sensors or seat belt sensors of a vehicle. Additionally, image capture components or the like can be used to recognize whether other individuals are within viewing distance of a display or earshot of audio portions of a presentation or a rendering. Effectively, the privacy component 180 can recognize when someone is looking over a user's shoulder. In this way, sensitive data, such as private financial information can be hidden from view or not presented to unauthorized users.

The privacy component 180 can toggle between one or more security modes, such as a high security mode and a low security mode. The high security mode can be implemented when multiple entities, occupants, or individuals are detected. When a presentation is toggled into high security mode, sensitive data may be masked or hidden which would otherwise be shown. Conversely, low security mode may be implemented when merely the user is detected. Low security mode may be a mode where a presentation does not mask or hide sensitive data, such as personal banking information, account numbers, account balances, etc.

The privacy component 180 may toggle security modes based on a GPS location of a device. For example, when a vehicle is located or determined to be at a user's home address, presentations may be presented in low security mode. When the vehicle is in a public area, such as downtown, presentations or visualizations may be presented in a high security mode. As another example, if the vehicle is a convertible, when the vehicle has its top down, the privacy component 180 may toggle the security mode to be a high or higher security mode than when the top is up. In one or more embodiments, a user may be presented with one or more preferences regarding how sensitive data is to be displayed (e.g., always display, hide when in public, hide when multiple individuals are detected, etc.). In this way, a limited data set or a subset of a data set can be presented based on the presence of one or more individuals, a public setting, or a private setting. Here, when the top is down for the convertible, audio may be played at a lower volume or rendered as a visualization rather than an audio clip, for example.

In some scenarios, the data being rendered may relate to or be collected from the vehicle itself. That is, the presentation component 160 may render an automobile interface with information representing vehicle settings, audio settings, video settings, navigation settings, available commands, interface options, maintenance information, fuel levels, service offers, etc. These renderings may be presented on a display of the vehicle, a display associated or connected to the vehicle (e.g., a display of a mobile device).

For example, the automobile interface may render content to a user or a driver of a vehicle based on a failure mode of the vehicle. For example, if a vehicle detects a flat tire, the vehicle may provide or render directions to a tire shop or a mechanic, a telephone number of a mechanic, or an alert that a mechanic is around the corner. As another example, if an oil change light is detected, an advertisement for an oil change place may be presented. As described above, presentations may be based on properties of available interfaces. For example, if a video advertisement is best viewed on displays larger than 3 inches, an audio clip may be played when a vehicle is equipped with smaller displays (e.g., less than 3 inches wide). In other embodiments, a telephone number may be provided in lieu of the video advertisement, for example.

In one or more embodiments, the system 100 for providing a vehicle interface can include a communication component 120 which receives one or more data sets. The communication component 120 can receive one or more of the data sets from a server (e.g., such as when a banking data set is being accessed) or a third party or from one or more controller area networks (CANs) of the vehicle. Data sets may include account information associated with the user or other types of data, such as vehicle data, maintenance data, or fuel data. That is, data sets may be received from a remote location via a wireless channel or a telematics channel or internally from the vehicle. An access component 110 can control access to one or more of the data sets by validating an identity of a user and granting or denying access based on the user identity.

A detection component 140 can detect or determine one or more device properties of a vehicle or one or more vehicle properties of a vehicle. The presentation component 160 can render one or more of the data sets based on one or more of the device properties. Further, the presentation component 160 can render or provide the renderings within an automobile interface.

The system 100 can include a privacy component 180 for selecting a security mode from a high security mode or a low security mode. Additionally, the system can include an image capture component for receiving one or more gestures from a user or determining a number of individuals within a frame. In one or more embodiments, the privacy component 180 can select the security mode based on the number of individuals within the frame. The system 100 can include a microphone for detecting a number of distinct voices and the privacy component 180 can select the security mode based on the number of distinct voices. The system 100 can include one or more sensors for detecting a number of occupants in the vehicle. One or more of the sensors can be weight sensors or seat belt sensors. The privacy component 180 can select the security mode based on the number of occupants in the vehicle.

Figure 11:
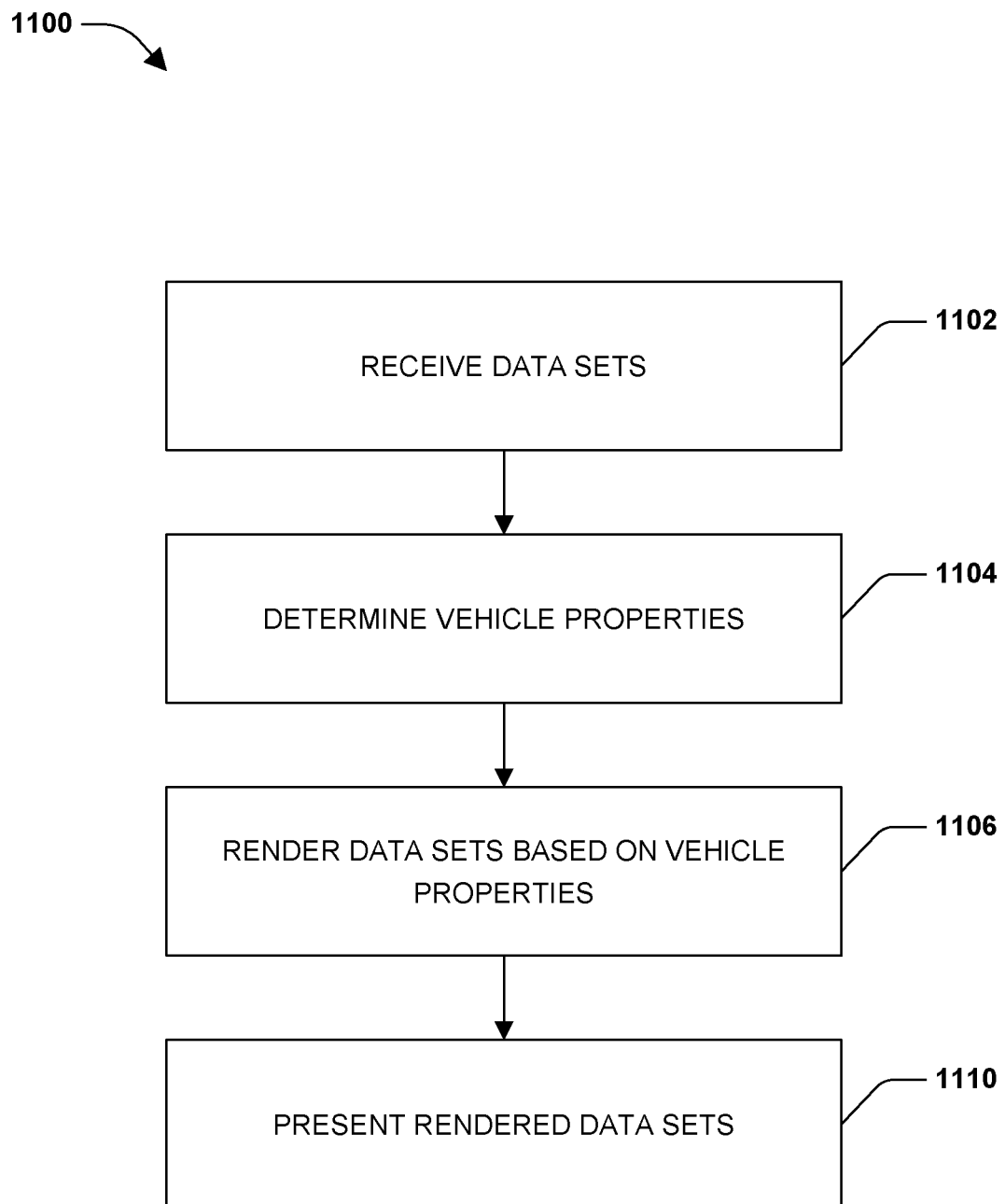
FIG. 11 is an illustration of an example flow diagram of a method for providing a vehicle interface, according to one or more embodiments.

FIG. 11 is an illustration of an example flow diagram of a method 1100 for providing a vehicle interface, according to one or more embodiments. At 1102, a data set can be received. At 1104, one or more vehicle properties can be determined or detected. At 1106, one or more data sets can be rendered based on one or more of the vehicle properties. At 1108, one or more of the data sets can be presented.

In one or more embodiments, a system for data presentation can connect individuals or entities as the individuals or people communicate. The system can render visualizations to the individuals to show them how the connections happen. It may not be known what type of data will be received by the system. For example, if the storage component 130 receive strings from one or more conversations between two or more individuals or entities, the data engine 150 may recognize that the conversation includes general banter between the two entities, individuals, or parties. The matching component 170 or the presentation component 160 may analyze one or more renderings, presentations, or visualizations from a pool of presentations or renderings to determine which one would be the most meaningful for rendering conversational text according to a desired format. The matching component 170 may score one or more of the presentations, assign the respective presentations a presentation score, and rank the presentations accordingly. Here, the presentation component 160 may create a visualization or rendering with a word cloud within an existing interface, rendering, visualization, or presentation.

Figure 12:
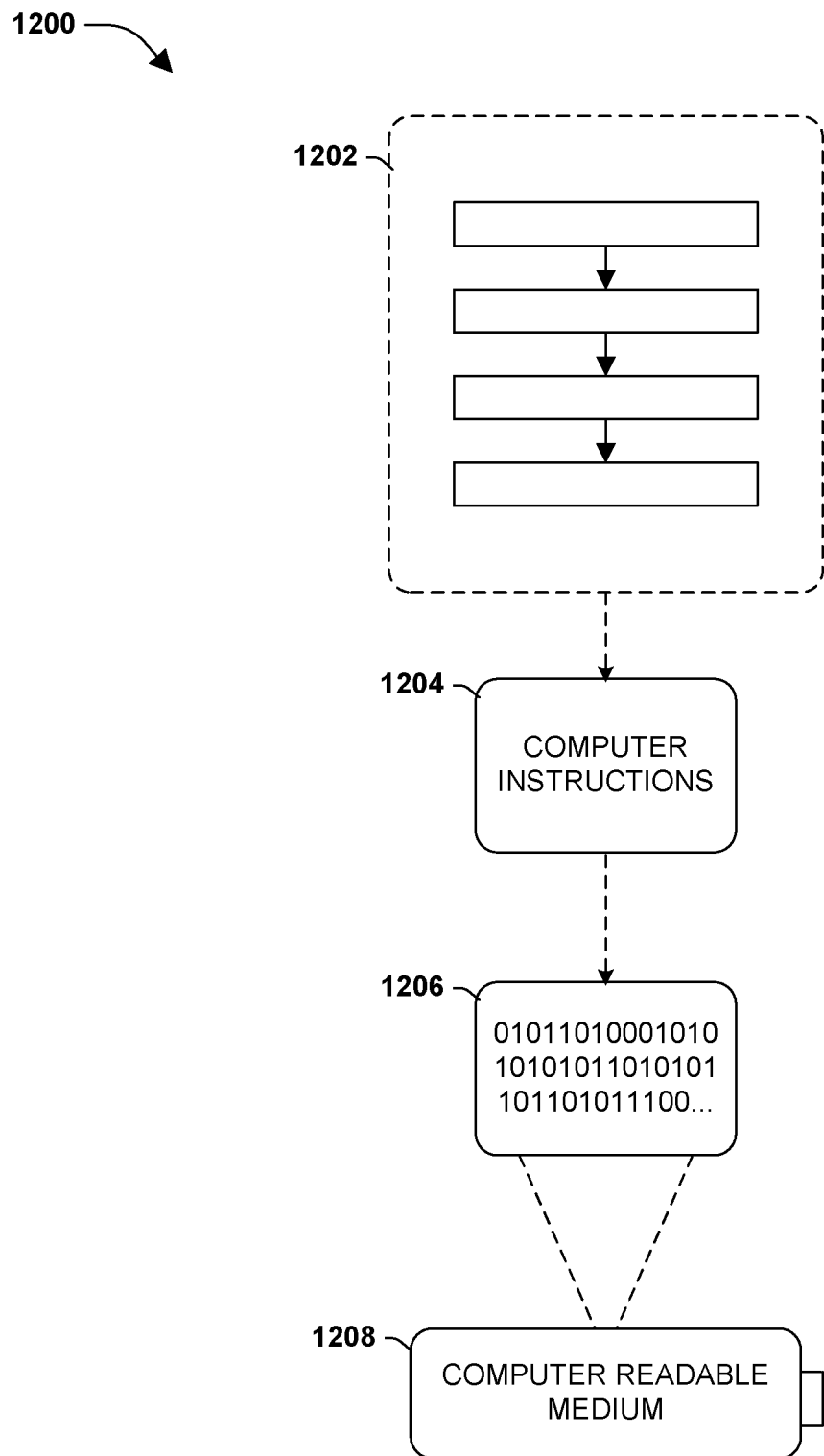
FIG. 12 is an illustration of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device that is devised in these ways is illustrated in FIG. 12, wherein an implementation 1200 includes a computer-readable medium 1208, such as a CD-R, DVD-R, flash drive, a platter of a hard disk drive, etc., on which is encoded computer-readable data 1206. This computer-readable data 1206, such as binary data including a plurality of zero's and one's as shown in 1206, in turn includes a set of computer instructions 1204 configured to operate according to one or more of the principles set forth herein. In one such embodiment 1200, the processor-executable computer instructions 1204 are configured to perform a method 1202, such as the method 200 of FIG. 2, the method 300 of FIG. 3, etc. In another embodiment, the processor-executable instructions 1204 are configured to implement a system, such as the system 100 of FIG. 1, the system 800 of FIG. 8, etc. Many such computer-readable media are devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 13 and the following discussion provide a description of a suitable computing environment to implement embodiments of one or more of the provisions set forth herein. The operating environment of FIG. 13 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions can be distributed via computer readable media as will be discussed below. Computer readable instructions can be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 13 illustrates a system 1300 including a computing device 1312 configured to implement one or more embodiments provided herein. In one configuration, computing device 1312 includes at least one processing unit 1316 and memory 1318. Depending on the exact configuration and type of computing device, memory 1318 may be volatile, such as RAM, non-volatile, such as ROM, flash memory, etc., or a combination of the two. This configuration is illustrated in FIG. 13 by dashed line 1314.

In other embodiments, device 1312 includes additional features or functionality. For example, device 1312 can include additional storage such as removable storage or non-removable storage, including, but not limited to, magnetic storage, optical storage, etc. Such additional storage is illustrated in FIG. 13 by storage 1320. In one or more embodiments, computer readable instructions to implement one or more embodiments provided herein are in storage 1320. Storage 1320 can store other computer readable instructions to implement an operating system, an application program, etc. Computer readable instructions can be loaded in memory 1318 for execution by processing unit 1316, for example.

The term "computer readable media" as used herein includes computer storage media. Computer storage media includes volatile and nonvolatile, removable and non-removable media implemented in any method or technology for storage of information such as computer readable instructions or other data. Memory 1318 and storage 1320 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1312. Any such computer storage media is part of device 1312.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 1312 includes input device(s) 1324 such as keyboard, mouse, pen, voice input device, touch input device, infrared cameras, video input devices, or any other input device. Output device(s) 1322 such as one or more displays, speakers, printers, or any other output device may be included with device 1312. Input device(s) 1324 and output device(s) 1322 can be connected to device 1312 via a wired connection, wireless connection, or any combination thereof. In one or more embodiments, an input device or an output device from another computing device can be used as input device(s) 1324 or output device(s) 1322 for computing device 1312. Device 1312 can include communication connection(s) 1326 to facilitate communications with one or more other devices.

A classifier is a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to prognose or infer an action that a user desires to be automatically performed. In the case of the system 100 of FIG. 1, for example, attributes can be device properties or other device-specific attributes provided by the detection component 140 or determined from the data set or data set properties, and the classes can be categories or areas of interest (e.g., levels of priorities).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, one or more embodiments can employ classifiers that are explicitly trained (e.g., via a generic training data) as well as implicitly trained (e.g., via observing user behavior, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria.

According to one or more aspects, a method for intelligent data presentation is provided, including receiving a data set, transmitting one or more device properties of a target device or a device receiving the data set, receiving one or more presentation data objects based on one or more of the device properties, or rendering one or more presentations of the data set based on one or more of the presentation data objects. The method can include analyzing the data set to determine one or more data set properties, rendering one or more of the presentations based on one or more of the data set properties, rendering one or more of the presentations based on a pool of one or more available presentations, generating one or more presentation property summaries for one or more of the available presentations, rendering one or more of the presentations based on one or more of the presentation property summaries, scoring one or more of the presentations with one or more scores based on one or more of the device properties, selecting a best fit presentation from one or more of the presentations for the data set based on one or more of the scores, or rendering the best fit presentation. In one or more embodiments, the device is a mobile device, tablet device, set top box, or computer.

According to one or more aspects, a system for intelligent data presentation is provided, including a storage component for receiving a data set, a detection component for transmitting one or more device properties of a target device or device receiving the data set (e.g., the system itself), or a presentation component for receiving one or more presentation data objects, rendering one or more presentations of the data set based on one or more of the device properties and one or more of the presentation data objects. The system can include a data engine for analyzing the data set to determine one or more data set properties. The presentation component can render one or more of the presentations based on one or more of the data set properties. The system can include a matching component for scoring one or more of the presentations with one or more scores based on one or more of the device properties. The matching component can select a best fit presentation from one or more of the presentations for the data set based on one or more of the scores. The presentation component can render the best fit presentation. A device or target device can be a device which receives the data set or a device which is intended to receive the data set.

According to one or more aspects, a method for intelligent data presentation is provided, including receiving one or more data set properties of a data set being accessed by a device, receiving one or more device properties of the device, determining one or more presentations to be rendered by the device based on one or more of the data set properties and one or more of the device properties, or transmitting one or more presentation data objects for one or more of the presentations. The method can include generating one or more of the presentations to be rendered by the device based on one or more of the data set properties and one or more of the device properties, transmitting one or more of the presentations, or determining one or more of the presentations based on a pool of one of more available presentations.

According to one or more aspects, a system for providing a banking interface is provided. The system can include an access component for validating an identity of a user, a data engine for retrieving account information associated with the user, a detection component for determining one or more device properties of a device accessing the account information, and a presentation component. The presentation component can receive one or more presentation data objects based on one or more of the device properties and render one or more portions of the account information based on one or more of the presentation data objects.

The account information may be associated with a checking account, a savings account, spending history, a mortgage, or an inquiry. The account information may be associated with one or more access levels for one or more databases. The device can be a mobile device, a tablet device, or a computing device. One or more of the user interactions can be a gesture, a touch input, a keystroke, a mouse input, or a voice command. The presentation component can generate one or more reports for one or more portions of the account information. The detection component can receive one or more user interactions with the device. The presentation component can render one or more portions of the account information based on one or more of the user interactions with the device. The presentation component may render one or more portions of the account information based on a global positioning system (GPS) location of the device. The presentation component may render or suggest one or more financial products based on one or more inquiries, such as inquires submitted by a user.

The presentation component can render one or more portions of the account information based on a number of displays associated with the device. The presentation component can render one or more portions of the account information based on one or more network characteristics associated with the device. The presentation component can render one or more portions of the account information based on a data plan associated with the device. The presentation component can render one or more portions of the account information based on a display size associated with the device.

According to one or more aspects, a system for providing a banking interface is provided. The system can include an access component for validating an identity of a user, a data engine for retrieving account information associated with the user, a detection component for determining one or more device properties of a device accessing the account information, and a presentation component. The presentation component can receive one or more portions of rendered account information based on one or more of the device properties. The detection component can transmit one or more of the device properties to a server. One or more of the device properties may be a processor speed, available memory, or a graphical processing unit (GPU) property. The account information may be associated with a checking account, a savings account, spending history, a mortgage, or an inquiry. The presentation component can receive one or more reports for one or more portions of the account information.

According to one or more aspects, a method for providing a banking interface is provided. The method can include validating an identity of a user, retrieving account information associated with the user, determining one or more device properties of a device accessing the account information, receiving one or more presentation data objects based on one or more of the device properties, rendering one or more portions of the account information based on one or more of the device properties and one or more of the presentation data objects.

According to one or more aspects, a system for providing a function based interface is provided. The system can include one or more databases comprising one or more data sets having one or more data set properties, an access component for validating an identity of a user, a data engine for retrieving one or more of the data sets based on an inquiry from the user and the identity of the user, a detection component for determining one or more device properties of a device accessing one or more of the data sets, and a presentation component. The presentation component can receive one or more presentation data objects based on one or more of the device properties and one or more of the data set properties, render one or more interfaces which present one or more of the retrieved data sets, wherein the rendering is based on one or more of the presentation data objects and the identity of the user.

One or more of the data sets can include data associated with one or more existing clients or one or more potential clients, data associated with one or more access levels for one or more entities for one or more of the databases, or data associated with an inventory level. The presentation component can generate one or more reports for one or more of the data sets based on the inquiry from the user, generate one or more reports for one or more of the data sets based on the identity of the user, or render one or more of the reports. One or more of the reports can include status information associated with the inquiry from the user. The data engine can receive a current scenario or a hypothetical scenario from the user. The presentation component can render one or more presentations based on the current scenario or the hypothetical scenario.

According to one or more aspects, a method for providing a function based interface is provided. The method can include validating an identity of a user, retrieving one or more data sets based on an inquiry from the user and the identity of the user, determining one or more device properties of a device accessing one or more of the data sets, receiving one or more presentation data objects based on one or more of the device properties and one or more data set properties of one or more of the data sets, rendering one or more interfaces which present one or more of the retrieved data sets, wherein the rendering is based on one or more of the presentation data objects and the identity of the user.

One or more of the data sets can include data associated with one or more existing clients or one or more potential clients, data associated with one or more access levels for one or more entities for one or more of the databases, or data associated with an inventory level. The method can include generating one or more reports for one or more of the data sets based on the inquiry from the user or generating one or more reports for one or more of the data sets based on the identity of the user.

One or more aspects provide for a computer-readable storage medium including computer-executable instructions, which when executed via a processing unit on a computer performs acts as described herein.

According to one or more aspects, a system for interfacing with an automated teller machine (ATM) is provided. The system can include an automated teller machine (ATM), an input device with a touch screen or a keypad, a detection component for detecting one or more user interactions with the ATM, wherein the user interactions are not received from the input device, and a presentation component. The presentation component can render account information of a user or one or more advertisements on an ATM display based on one or more of the user interactions or process one or more transactions based on one or more of the user interactions. The system can include an image capture component for receiving one or more of the user interactions, a deposit slot for accepting one or more deposits, a card reader for accepting one or more banking cards, a cash dispenser for dispensing funds. One or more of the user interactions can be a gesture or a wave. The image capture component can determine a number of individuals within a frame. The presentation component can render the account information of the user based on the number of individuals within the frame. The presentation component can render a pointer based on one or more of the user interactions. One or more of the transactions can include a transfer of funds or a withdrawal of funds.

According to one or more aspects, a system for interfacing with an automated teller machine (ATM) is provided. The system can include an automated teller machine (ATM), an input device having a touch screen or a keypad, a cash dispenser, a communication component for receiving one or more user interactions with the ATM, and a presentation component. The presentation component can render account information of a user or one or more advertisements on an ATM display based on one or more of the user interactions or process one or more transactions based on one or more of the user interactions. The presentation component can render one or more of the advertisements based on one or more remote user interactions or render one or more of the advertisements based on receiving no user interactions from the input device. The system can include one or more speakers for presenting one or more portions of the account information or one or more available options in audio format or a microphone for determining an ambient noise level. A volume for one or more of the speakers may be determined based on the ambient noise level.

According to one or more aspects, a system for interfacing with an automated teller machine (ATM) is provided. The system can include a communication component for coupling a device with an automated teller machine (ATM), a detection component for detecting one or more user interactions with the ATM, and a presentation component. The presentation component can render account information of a user based on one or more of the user interactions or transmit one or more transaction requests to the ATM based on one or more of the user interactions. The detection component can include an image capture component for determining a number of individuals within a frame. The system can include a privacy component for selecting a security mode from a high security mode or a low security mode based on the number of individuals within the frame. The presentation component can render the account information based on the selected security mode.

According to one or more aspects, a system for providing a call center interface is provided. The system can include a call distribution component for managing one or more incoming calls from one or more customers, a storage component for storing one or more logs associated with one or more of the customers, a detection component for determining one or more device properties of a customer service representative (CSR) device, and a presentation component. The presentation component can render a call center interface based on one or more of the device properties and one or more of the logs.

In one or more embodiments, the call distribution component can distribute one or more of the incoming calls based on linear call distribution, circular call distribution, uniform call distribution, simultaneous call distribution, or weighted call distribution. One or more of the logs can include wait time data, call time data, queue data, customer satisfaction data, interactive voice response (IVR) data, or path data associated with one or more of the customers. The call distribution component can transfer one or more of the incoming calls to the CSR device. One or more of the device properties is a number of displays associated with the CSR device. The presentation component can render a first subset of data from one or more of the logs on a first display associated with the CSR device and a second subset of data from one or more of the logs on a second display associated with the CSR device when two or more displays are detected for the CSR device.

A detection component can receive one or more gestures from a CSR (utilizing the CSR device). The call center interface can initiate one or more call center operations based on one or more of the gestures. The presentation component can modify the call center interface based on one or more of the gestures. The storage component can modify one or more of the logs based on one or more of the gestures.

According to one or more aspects, a system for providing a call center interface is provided. The system can include a call distribution component for managing one or more incoming calls from one or more customers, a storage component for storing one or more logs associated with one or more of the customers, a detection component for determining one or more device properties of a customer service representative (CSR) device, wherein the detection component can receive one or more gestures from a CSR, and a presentation component. The presentation component can render a call center interface based on one or more of the device properties and one or more of the logs or render the call center interface. The presentation component can render a pointer within the call center interface based on one or more of the gestures. The detection component can detect one or more of the gestures based on gaze detection. The CSR device can include a mouse or a keyboard. One or more of the logs can be indicative of a server status. The call distribution component can manage one or more of the incoming calls based on one or more of the gestures.

According to one or more aspects, a method for providing a call center interface is provided. The method can include managing one or more incoming calls from one or more customers, accessing one or more logs associated with one or more of the customers, determining one or more device properties of a customer service representative (CSR) device, rendering a call center interface based on one or more of the device properties and one or more of the logs. Additionally, the method can include distributing one or more of the incoming calls based on linear call distribution, circular call distribution, uniform call distribution, simultaneous call distribution, or weighted call distribution. One or more of the logs can include wait time data, call time data, queue data, customer satisfaction data, interactive voice response (IVR) data, or path data associated with one or more of the customers. One or more of the device properties can be a number of displays associated with the CSR device.

According to one or more aspects, a system for providing a vehicle interface is provided. The system can include a communication component for receiving one or more data sets, a detection component for determining one or more device properties of a vehicle, and a presentation component. The presentation component can render one or more of the data sets based on one or more of the device properties or one or more of the rendered data sets. The system can include an access component for validating an identity of a user. One or more of the data sets can include account information associated with the user. One or more of the data sets can include vehicle data, maintenance data, or fuel data. The system can include a privacy component for selecting a security mode from a high security mode or a low security mode. The system can include an image capture component for receiving one or more gestures from a user or determining a number of individuals within a frame. In one or more embodiments, the privacy component can select the security mode based on the number of individuals within the frame. The system can include a microphone for detecting a number of distinct voices and the privacy component can select the security mode based on the number of distinct voices. The system can include one or more sensors for detecting a number of occupants in the vehicle. One or more of the sensors can be weight sensors or seat belt sensors. The privacy component can select the security mode based on the number of occupants in the vehicle. The communication component can receive one or more of the data sets based on a telematics channel. The communication component can receive one or more of the data sets based on one or more controller area networks (CANs).

According to one or more aspects, a method for providing a vehicle interface is provided. The method can include receiving one or more data sets, determining one or more vehicle properties of a vehicle, or rendering one or more of the data sets based on one or more of the vehicle properties. The method can include validating an identity of a user, selecting a security mode from a high security mode or a low security mode, or detecting a number of occupants in the vehicle, wherein selecting the security mode is based on the number of detected occupants. One or more of the data sets may include account information associated with the user.

According to one or more aspects, a system for providing a vehicle interface is provided. The system can include a communication component for accessing one or more data sets, a detection component for analyzing one or more vehicle properties of a vehicle, and a presentation component. The presentation component can receive one or more renderings for one or more of the data sets based on one or more of the vehicle properties or one or more of the renderings.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" can include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A data presentation system for providing an augmented call center interface that processes data and metadata changes of an input data set, comprising:
   a detection component that determines data, metadata and devices associated with the input data set, and determines changes in data, metadata and devices associated with the input data set;
   an inference engine that provides a multi-level inference based at least in part on the determined data, metadata and devices and based at least in part on the determined changes in data, metadata and devices, that is independent of a hierarchical structure of the input data set; and
   a presentation component that renders a set of presentations of the augmented call center interface that is augmented by the multi-level inference as a function of determined changing data of the data set;
   wherein the determining, by the detection component, includes treating data and metadata as separable, as well as the determined changes comprise inference engine processing of changes of multi-level prioritizing, binding/unbinding, visibility changes, weighing and scoring of data and metadata, and includes feeds of results of inferences to the inference engine as additional input.

2. A data presentation system for providing an augmented call center interface that processes data and metadata changes of an input data set, comprising:
   a server, a user device, and a call center service device associated in a call center system;
   a deployment schema that associates a processing unit that executes the following computer executable components stored in a memory:
   a detection component that determines data, metadata and devices associated with the input data set, and determines changes in data, metadata and devices associated with the input data set;
   an inference engine that provides a multi-level inference based at least in part on the determined data, metadata and devices and based at least in part on the determined changes in data, metadata and devices, that is independent of a hierarchical structure of the input data set; and
   a presentation component that renders a set of presentations of the augmented call center interface that is augmented by the multi-level inference as a function of determined changing data of the data set and that provides an dynamic rescore and reselect of presentations from the set of presentations;
   wherein the multi-level inference is based at least in part on system elements of hardware, software and system characteristics, including shadow channels, the rendered presentation of the set of presentations is further determined by a particular device of the user device and the call center service device to which the deployment schema associates, and the rendered presentation may be pre-rendered and collected into a pool of presentations, rendered dynamically, or a combination of pre-rendered and rendered dynamically based at least in part on the inference engine, and
   further wherein the determining, by the detection component, includes treating data and metadata as separable, as well as the determined changes comprise inference engine processing of changes of multi-level prioritizing, binding/unbinding, visibility changes, weighing and scoring of data and metadata, and includes feeds of results of inferences to the inference engine as additional input.

3. A data presentation system for providing an augmented call center interface that processes data and metadata changes of an input data set, comprising:
   a server, a user device, and a call center service device associated in a call center system;
   a deployment schema that associates a processing unit that executes the following computer executable components stored in a memory:
   a detection component that determines data, metadata and devices associated with the input data set, and determines changes in data, metadata and devices associated with the input data set;
   an inference engine that provides a multi-level inference based at least in part on the determined data, metadata and devices and based at least in part on the determined changes in data, metadata and devices, that is independent of a hierarchical structure of the input data set; and
   a presentation component that renders a set of presentations of the augmented call center interface that is augmented by the multi-level inference as a function of determined changing data of the data set and that provides an dynamic rescore and reselect of presentations from the set of presentations;
   wherein the multi-level inference is based at least in part on system elements of hardware, software and system characteristics, including shadow channels, the rendered presentation of the set of presentations is further determined by a particular device of the user device and the call center service device to which the deployment schema associates, and the rendered presentation may be pre-rendered and collected into a pool of presentations, rendered dynamically, or a combination of pre-rendered and rendered dynamically based at least in part on the inference engine, wherein the multi-level inference yields a projected intent, use, or purpose based at least in part as a function of the determined changing data of the data set, wherein the projected intent comprises potential data throttling based on inferred data use, and wherein an inferred determination of a field of interest in the data set drives the data presentation.

4. The data presentation system of claim 3, wherein a gesture capture capability of the detection component is enabled by the inference engine to provide a contextual gesture determination associated with the set of presentations rendered by the presentation component.

* * * * *